US012658502B2

(12) United States Patent
Flannery

(10) Patent No.: US 12,658,502 B2
(45) Date of Patent: Jun. 16, 2026

(54) BATTERY PACK AND A METHOD OF MANUFACTURING A BATTERY PACK

(71) Applicant: Xerotech Limited, Oranmore (IE)

(72) Inventor: Barry Flannery, Oranmore (IE)

(73) Assignee: Xerotech Limited, Oranmore (IE)

( * ) Notice: Subject to any disclaimer, the term of this patent is extended or adjusted under 35 U.S.C. 154(b) by 677 days.

(21) Appl. No.: 17/291,482

(22) PCT Filed: Oct. 18, 2019

(86) PCT No.: PCT/EP2019/078461
§ 371 (c)(1),
(2) Date: May 5, 2021

(87) PCT Pub. No.: WO2020/094365
PCT Pub. Date: May 14, 2020

(65) Prior Publication Data
US 2022/0263159 A1 Aug. 18, 2022

(30) Foreign Application Priority Data
Nov. 5, 2018 (GB) ...................................... 1818053

(51) Int. Cl.
*H01M 10/6557* (2014.01)
*F28F 1/08* (2006.01)
(Continued)

(52) U.S. Cl.
CPC ........... *H01M 10/6557* (2015.04); *F28F 1/08* (2013.01); *F28F 21/062* (2013.01);
(Continued)

(58) Field of Classification Search
CPC ........... H01M 10/617; H01M 10/0525; H01M 10/613; H01M 10/615; H01M 10/625;
(Continued)

(56) References Cited

U.S. PATENT DOCUMENTS

2002/0177035 A1* 11/2002 Oweis ............... H01M 10/6567
429/120
2009/0023056 A1 1/2009 Adams et al.
(Continued)

FOREIGN PATENT DOCUMENTS

CN 108598624 * 9/2018

OTHER PUBLICATIONS

PCT/EP2019/078461 International Search Report and Written Opinion of the International Searching Authority dated Feb. 6, 2020 (8 pages).
(Continued)

*Primary Examiner* — Matthew W Van Oudenaren
(74) *Attorney, Agent, or Firm* — Amundsen Davis, LLC

(57) ABSTRACT

A battery pack comprises one or more cells 30, a flexible duct 50 positioned proximally to the surface of at least one of the one or more cells 30 such that heat can be exchanged between the duct 50 and at least one of the one or more cells 30 and a potting means which at least partially surrounds at least a part of the duct 50. A method of manufacturing a battery pack comprises providing one or more cells 30, positioning a flexible duct 50 proximally to the surface of at least one of the one or more cells 30 such that heat can be exchanged between the duct 0 and the at least one of the one or more cells 30, inserting fluid into the duct 50 and at least partially surrounding at least a part of the duct 50 with a potting means. The potting means may be expandable foam.

25 Claims, 25 Drawing Sheets

(51) Int. Cl.

| | |
|---|---|
| *F28F 21/06* | (2006.01) |
| *H01M 10/0525* | (2010.01) |
| *H01M 10/613* | (2014.01) |
| *H01M 10/615* | (2014.01) |
| *H01M 10/617* | (2014.01) |
| *H01M 10/625* | (2014.01) |
| *H01M 10/643* | (2014.01) |
| *H01M 10/653* | (2014.01) |
| *H01M 10/6568* | (2014.01) |
| *H01M 10/658* | (2014.01) |
| *H01M 50/213* | (2021.01) |

(52) U.S. Cl.
CPC ..... *H01M 10/0525* (2013.01); *H01M 10/613* (2015.04); *H01M 10/615* (2015.04); *H01M 10/617* (2015.04); *H01M 10/625* (2015.04); *H01M 10/643* (2015.04); *H01M 10/653* (2015.04); *H01M 10/6568* (2015.04); *H01M 10/658* (2015.04); *H01M 50/213* (2021.01); *F28F 2255/02* (2013.01); *H01M 2220/20* (2013.01)

(58) Field of Classification Search
CPC ............. H01M 10/643; H01M 10/653; H01M 10/6557; H01M 10/6568; H01M 10/658; H01M 10/627; H01M 10/6567; H01M 10/652; H01M 10/60; H01M 10/61; H01M 10/6552; H01M 10/6556; H01M 10/6565; H01M 50/213; H01M 50/289; H01M 2220/10; H01M 2220/20
See application file for complete search history.

(56) References Cited

U.S. PATENT DOCUMENTS

| | | | |
|---|---|---|---|
| 2012/0177960 A1* | 7/2012 | Tasai ................. | H01M 10/6568 |
| | | | 361/535 |
| 2013/0230760 A1 | 9/2013 | Pan et al. | |
| 2018/0131055 A1 | 5/2018 | Yang | |
| 2018/0223070 A1* | 8/2018 | O'Neil ............. | H01M 10/6557 |

OTHER PUBLICATIONS

PCT/EP2019/078461 International Preliminary Report on Patentability dated Oct. 23, 2020 (12 pages).

* cited by examiner

221

222

220

223

552 550 554

552

550

554

652          650          654

652          650

654

653

651

750     752

750

752

754

1206a

1208

1201

1206b 1236, 1237

1235 1208

1210

1209

1211

1205

1206b

1206a

1239a

1207

1239b

1303

1308a

1305

1337, 1338

BATTERY PACK AND A METHOD OF MANUFACTURING A BATTERY PACK

CROSS REFERENCE TO RELATED APPLICATIONS

This application is a nationalization of and claims priority to PCT/EP2019/078461, filed on Oct. 18, 2019, which claims priority to GB1818053.9, filed on Nov. 5, 2018, the disclosures of each of which are hereby incorporated by reference in their entirety.

The present invention relates to a battery pack and its method of manufacture, particularly a vehicle battery pack having a thermal management system.

The key requirements for next-generation battery packs, particularly lithium-ion battery packs for vehicular applications, are improved gravimetric and volumetric energy density, improved cycle life and fast-charging. Gravimetric and volumetric energy densities are largely improved through advances in cell electrochemistry and chemical engineering. However, improvements in the mechanical design of the battery pack also have an appreciable impact on the overall weight and size of the pack. Battery pack mechanical design impacts cycle life and fast-charging capability mainly through the thermal management system. The thermal management system can be used to minimise temperature variations within the pack to prevent differential cell aging which would ultimately result in reduced cycle life. Furthermore, it is important to maintain a relatively constant temperature of 25° C. throughout the battery pack to maximise cell lifetime. The latter is particularly challenging to maintain during fast-charging due to the high heat generation within the pack.

Thermal management systems in state-of-the-art battery packs typically include a heat exchanger in the form of a duct. The duct provides a conduit through which a coolant material can pass through the pack to cool or warm the individual cells. Flexible ducts are particularly useful since they are lightweight and can closely conform to the shape of the cells when in a pressurised or inflated state. However, a significant drawback of using flexible ducts has been that they are liable to bursting: a build-up of pressure within the duct causes the duct wall(s) to stretch and thin, reducing the strength of the walls and potentially leading to leakage of coolant within the pack. While the risk of bursting can be mitigated by increasing the wall thickness of the duct, doing so also increases the thermal resistance of the duct and therefore the effectiveness of the thermal management system.

A further problem with state-of-the-art battery packs is their propensity to catch fire. The risk of fire within a battery pack is increased when the cells are exposed to high temperatures, when short circuits develop and/or when the internal structure of the cells are compromised. For example, lithium plating and/or crystal formation within a cell can puncture internal cell dielectric membranes, resulting in potentially catastrophic short circuits and explosion of the cell. Such an event can spread throughout the pack causing all of the cells to catch fire. There exists a need for a way of stopping or reducing the spread of excessive heat from a localised region within a battery pack.

It is an object of the invention to obviate or mitigate the problems outlined above. In particular, it is an object of the invention to provide a thin, flexible duct for use in a thermal management system where the duct has a reduced risk of bursting.

It is a further object of the invention to provide a battery pack which is inherently fire-retardant.

It is a yet further object of the invention to provide a thermal management system which is in good thermal contact with one or more cells.

According to a first aspect of the invention there is provided a battery pack comprising: one or more cells; a flexible duct positioned proximally to the surface of at least one of the one or more cells such that heat can be exchanged between the duct and at least one of the one or more cells; and a potting means adapted to act as a support for at least a part of the duct. Advantageously the flexible duct can closely conform to the surface shape of the cells within the pack while being reinforced by the potting means which acts to prevent the flexible duct from over inflation and/or bursting.

Optionally the battery pack comprises a plurality of ducts.

Preferably the one or more ducts are serpentine ducts.

Optionally the one or more ducts are manifold ducts.

Optionally the battery pack comprises one or more substantially straight ducts.

Optionally the battery pack comprises one or more parallel ducts.

Preferably the or each duct comprises one or more substantially straight sections.

Preferably the or each duct is configured to carry a coolant fluid.

Preferably the or each duct is configured to carry a water-glycol mixture.

Preferably the or each duct is pressurised by the coolant fluid to an inflated state.

Preferably the or each duct, when in the inflated state, is in conformity with the surface of one or more cells. Advantageously, inflating the flexible duct such that its shape conforms to the shape of the cells improves the thermal contact between the or each duct and the cells such that the coolant fluid may transfer thermal energy between the coolant fluid and the cells more efficiently.

Preferably the shape of the or each duct partially conforms to at least part of the surface of one or more cells.

Preferably the cells are cylindrical cells. Advantageously, the flexible duct is well suited for use with cylindrical cells as the duct can expand and conform to the undulating surface of the cylindrical cells, ensuring good thermal contact between the cells and the duct.

Preferably the battery pack comprises an array of cells.

Preferably the array of cells are in a close-packed configuration.

Preferably the minimum separation between the cells is 0.5-5 mm.

Preferably the minimum separation between the cells is 2 mm.

Preferably the flexible duct is positioned adjacent to one or more cells.

Preferably the flexible duct is positioned between cells.

Preferably the flexible duct is in direct contact with side surface(s) of the one or more cells.

Preferably the flexible duct is in indirect contact with side surface(s) of the one or more cells via an interface region or interface material.

Preferably the flexible duct is in indirect contact with side surface(s) of the one or more cells via a casing sheath surrounding the cell(s).

Preferably the flexible duct is in indirect contact with side surface(s) of the one or more cells via a thermally conductive filler material such as a conductive paste or adhesive.

Ideally the flexible duct is formed from a polymer-based material.

Preferably the flexible duct is formed from an inflatable plastics material. An inflatable plastics material is advantageous as the material is intrinsically electrically insulating, lightweight and does not corrode or chemically interact with a coolant such as a glycol water mix.

Ideally the inflatable plastics material is low-density polyethylene (LDPE).

Ideally the inflatable plastics material is linear low-density polyethylene (LLDPE).

Ideally the inflatable plastics material is high-density polyethylene (HDPE).

Ideally the inflatable plastics material is polyester.

Ideally the walls of the flexible duct are between 10 μm and 150 μm thick. Advantageously, the inflatable plastics material may be made very thin which allows for good thermal transfer properties between the or each duct and the cells.

Preferably the flexible duct is a single-lumen duct.

Optionally the flexible duct is a multi-lumen duct. A multi-lumen duct may be used in large battery packs where a single lumen duct is not capable of promoting an even temperature distribution.

Ideally the multi-lumen duct comprises two or more lumens along which coolant fluid may flow.

Preferably the battery pack comprises a battery pack housing.

Preferably the battery pack comprises a lower clamshell.

Preferably the battery pack comprises an upper clamshell.

Preferably the lower clamshell and/or upper clamshell comprises one or more recesses for receiving and retaining cell(s).

Preferably the lower clamshell and/or upper clamshell comprises one or more apertures for receiving electrical connections to the cells.

Preferably one or more busbars are provided on the upper clamshell and/or lower clamshell.

Preferably the upper clamshell and/or lower clamshell comprise one or more apertures for electrically connecting cell(s) to the busbar(s).

Preferably the battery pack comprises one or more sidewalls.

Preferably the one or more sidewalls are attached to the lower clamshell.

Preferably the one or more sidewalls are attached to the upper clamshell.

Preferably the battery pack comprises a fluid inlet means.

Preferably the fluid inlet means provides a fluid entrance to the or each duct.

Preferably the fluid inlet means comprises an inlet nozzle.

Preferably the battery pack comprises a fluid outlet means.

Preferably the fluid outlet means comprises an outlet nozzle.

Preferably the fluid outlet means provides a fluid exit from the or each duct.

Preferably the fluid inlet means and/or fluid outlet means pass through apertures in the side wall(s).

Preferably the battery pack comprises at least one further flexible duct which is positioned between further cells.

Preferably the potting means comprises a potting material.

Ideally the potting means comprises foam. Advantageously foam is lighter than other potting materials and therefore reduces the overall weight of the pack when compared with other potting materials.

Optionally the potting means comprises a thermosetting plastic, silicone rubber gel or epoxy resin.

Ideally the potting means comprises a thermally insulating foam. Beneficially thermally insulating foam can prevent a high energy thermal event propagating through the battery pack. Furthermore, thermally insulating foam can reduce the effect of external temperature fluctuations on the battery pack and helps to ensure that the duct is the primary controller of thermal energy within the battery pack.

Ideally the potting means comprises expanded foam. Advantageously use of an expandable foam within the battery pack means that the foam, when in the expanded state, can substantially fill any gaps within the battery pack. Coupled with the thermal insulation properties of the foam, the ability for thermal events to travel through the pack is significantly reduced.

Ideally the potting means comprises intumescent foam.

Ideally the potting means is a polyurethane foam.

Ideally the potting means acts as a support for at least a part of at least one duct.

Ideally the potting means acts as a rigid support for at least a part of at least one duct.

Ideally the potting means can be poured into the pack in a liquid state and sets, cures or hardens within the pack.

Ideally the potting means, in its set, cured or hardened state, is substantially rigid such that it secures the cell(s) and the duct(s) in position within the battery pack. This is advantageous as it reduces the effects of vibrations on components within the battery pack.

Preferably the potting means surrounds at least a part of at least one duct.

Preferably the potting means surrounds the duct and provides total external support to the at least one duct. Advantageously surrounding the duct with potting material prevents excessive expansion and/or bursting of the duct.

Preferably the potting means defines a cavity within which at least a part of at least one duct is located.

Preferably the volume within the battery pack housing is substantially filled with the cells, support structure, duct and potting means. Advantageously, substantially filling the battery pack ensures that moisture and/or corrosive agents are excluded from the space within the battery pack.

Preferably the potting means acts as an adhesive.

Preferably the potting means acts as an adhesive to secure the or each duct in position.

Preferably the or each duct has an open configuration such that a coolant material is able to flow through the duct.

Preferably the or each duct is maintained in an open configuration by pressurised coolant fluid within the or each duct and/or via adhesion to the potting means.

Preferably the potting means acts as an adhesive to maintain one or more duct(s) in an open configuration.

Preferably the potting means is adhesively attached to at least a part of one or more duct(s).

Preferably the potting means acts as an adhesive to secure the cell(s) in position.

Preferably the potting means acts as an adhesive to secure an outer casing to the battery pack. This beneficially negates the requirement for additional fixings or fasteners, reducing the complexity of the battery pack and improving the manufacturing process.

Preferably the battery pack comprises at least one support means configured to provide support to at least one duct.

Preferably the or each support means is locatable on the lower clamshell.

Preferably the one or more support means is located at the peripheral edge of the array of cells.

Preferably the or each support means is configured to provide support to a duct at a point where the duct changes and/or reverses direction. Advantageously, the support means prevents the duct from kinking at points where it reverses direction. Preventing kinking reduces blockages within the system, reduces pressure losses within the system and improves the flow rate of coolant fluid through the duct(s).

Preferably the or each support means comprises a guide channel.

Ideally the guide channel is configured to guide the flexible duct.

Preferably at least part of the flexible duct is located within a support means channel.

Locating the duct within a channel is advantageous as the channel guides the duct at points where the duct reverses direction thus preventing kinks. Furthermore, the channel provides support to the duct on both sides which prevents the duct bulging and potentially bursting.

Preferably the support means comprises at least one recess configured to partially receive the duct in an uninflated state such that slack is created in the duct. Beneficially, providing the duct with excess slack helps prevent the duct kinking when the duct is inflated. This is because as the duct is inflated it comes under tension and the excess slack helps to prevent excess tension building in the duct.

Preferably the support means is configured to provide a thermal barrier between at least one cell and the duct. This is beneficial because it is important to maintain a constant temperature distribution across the battery pack in order to prolong the life of the battery. By thermally insulating a cell at a location where there would be too much thermal contact between the duct and the cell, the thermal contact between the duct and the cells is kept substantially constant throughout the battery pack. This in turns promotes a constant temperature distribution across the battery pack.

Preferably the battery pack is operably connected to a thermal management system.

Preferably the thermal management system comprises a reservoir.

Preferably the reservoir is in fluid communication with a coolant loop.

Ideally the reservoir comprises a coolant fluid.

Preferably the reservoir provides hydrostatic pressure to coolant fluid in the coolant loop.

Preferably the thermal management system comprises a pump configured to pump coolant from the reservoir to the coolant loop to pressurise the coolant loop. Advantageously, coolant fluid in the reservoir may be used to pressurise the thermal management system. Beneficially this allows the pressure to be maintained within the thermal management system such that the pressure is maintained at a target operating pressure. Pressurising the duct via the reservoirs makes it self-supporting thus eliminating any of the hydrodynamic pressure loss from the pump and greatly reducing the pressure drop within the cooling system.

Ideally thermal management system comprises a pressure sensor to monitor the pressure of the coolant such that a target operating pressure is maintained.

Preferably the duct material comprises a matrix and a filler. Ideally the thermal conductivity of the filler is greater than the thermal conductivity of the matrix. Advantageously, the inclusion of filler within the matrix increases the thermal conductivity of the duct material.

Preferably the matrix is a flexible matrix.

Preferably the matrix is electrically insulating.

Preferably the matrix is a plastic matrix.

Preferably the matrix is a polymer matrix.

Preferably the matrix is a low-density polyethylene (LDPE) matrix, linear low-density polyethylene (LLDPE) matrix. high-density polyethylene (HDPE) matrix, polyester, silicone or rubber matrix.

Preferably the matrix has a thermal conductivity less than $15\ Wm^{-1}K^{-1}$, less than $10\ Wm^{-1}K^{-1}$, less than $5\ Wm^{-1}K^{-1}$ and/or less than $1\ Wm^{-1}K^{-1}$.

Preferably the filler comprises particles of a filler material.

Preferably the particles of filler material are dispersed throughout the matrix.

Preferably the particles of filler material have an average diameter of between 1 nm and 10 μm.

Preferably the particles of filler material have an elongate, tubular, fiber or substantially spherical shape.

Preferably the elongate particles of filler material have a diameter of 1-10 nm and optionally a length of 0.5-5 nm.

Preferably the filler comprises an organic filler material. Preferably the filler comprises a carbon-based filler material such as carbon, carbon black, graphite, graphite platelets graphene, multi-walled carbon nanotubes or single-wall carbon nanotubes.

Optionally the filler comprises an inorganic filler material. Optionally the filler comprises a ceramic filler material such as aluminium oxide, silicon carbide, boron nitride, silicon nitrate, alumina, aluminium nitride or zinc oxide.

Preferably the filler has a thermal conductivity greater than $10\ Wm^{-1}K^{1}$ and/or greater than $100\ Wm^{-1}K^{-1}$.

Preferably the duct material comprises less than 25% by volume of filler, 5-18% by volume of filler or 15% by volume of filler. Advantageously, incorporating a limited amount of filler into the matrix provides an increased thermal conductivity while maintaining a low electrical conductivity and suitable flexibility of the material.

Preferably the duct material has a thermal conductivity greater than $0.33\ Wm^{-1}K^{-1}$ at room temperature, greater than $1\ Wm^{-1}K^{-1}$ at room temperature and/or greater than 10 $Wm^{-1}K^{-1}$ at room temperature.

Ideally, the support means has an inner guide formation.

Ideally, the inner guide formation is locatable on the inside of the turn of a flexible duct when in use.

Preferably, the inner guide formation has an inner support face that is located between a cell and the flexible duct when in use.

Ideally, the support means has an outer guide formation, the outer guide formation having an outer supporting face.

Preferably, at least part of the guide path of the support means is defined between the inner supporting face of the inner guide formation and the outer supporting face of the outer guide formation.

The inner support face and/or the outer support face may be continuous or discontinuous.

Preferably at least a part of the support means is compressible. In its inflated state, the duct tends to pull in the direction of any bend within it due to tensioning. Advantageously, by making at least a part of the support means compressible allows the surface that the duct pulls against to yield slightly such the duct volume is prevented from kinking shut at the bend.

Ideally, the inner guide formation, most preferably, at least part of the inner support face, is compressible. Ideally, the inner guide formation comprises a compressible foam.

Preferably, at least part of the support means is integrally formed with a battery pack housing. Most preferably, at least part of the support means is integrally formed with a lower clamshell of a battery pack housing, or an upper casing of a battery pack housing.

Preferably, at least part of the battery pack housing forms part of the support structure. Most preferably, at least part of an inner sidewall of the battery pack housing is used to support the flexible duct.

According to a second aspect of the invention there is provided a method of manufacturing a battery pack, the method comprising: providing one or more cells; positioning a flexible duct proximally to the surface of at least one of the one or more cells such that heat can be exchanged between the duct and the at least one of the one or more cells; inserting fluid into the duct; and providing a potting means adapted to act as a support for at least a part of the duct. Advantageously the method provides a way to produce an improved battery pack including a duct which can closely conform to the surface shape of the cells and is reinforced by the potting means.

Preferably the method comprises providing an array of cells.

Preferably the method comprises providing one or more cylindrical cells.

Preferably the method comprises providing an array of close-packed cylindrical cells wherein the minimum separation between the cells is 0.5-5 mm.

Preferably the method comprises providing an array of close-packed cylindrical cells wherein the minimum separation between the cells is 2 mm.

Preferably the method comprises constructing the battery pack housing.

Preferably the method comprises providing a lower clamshell.

Preferably the method comprises locating one or more cells in recesses in the lower clamshell.

Preferably the method comprises providing one or more sidewalls.

Preferably the method comprises attaching the one or more sidewalls to the lower clamshell.

Preferably the method comprises providing an upper clamshell.

Preferably the method comprises locating one or more cells in recesses in the upper clamshell.

Preferably the method comprises attaching the one or more sidewalls to the upper clamshell.

Preferably the method comprises attaching one or more busbars to the upper clamshell and/or lower clamshell.

Preferably the method comprises fitting fluid inlet means to the or each duct.

Preferably the method comprises fitting fluid outlet means to the or each duct.

Preferably the method comprises passing an inlet nozzle and an outlet nozzle through apertures in the side wall(s).

Preferably the method comprises positioning the or each flexible duct in position adjacent to one or more cells.

Preferably the method comprises positioning the or each flexible duct between cells.

Preferably the method comprises positioning one or more further flexible ducts proximally to the surface of one or more cells such that heat can be exchanged between the or each further flexible duct and at least one of the one or more cells.

Preferably the step of positioning the flexible duct(s) between cells is performed after the step of locating one or more cells in recesses in the lower clamshell.

Preferably the step of positioning the flexible duct(s) between two or more cells is performed before the step of locating one or more cells in recesses in the upper clamshell.

Preferably the method comprises positioning the or each flexible duct along a serpentine path within the battery pack.

Preferably the method comprises positioning the or each duct proximally to the surface of at least one of the one or more cells when the or each duct is in a substantially uninflated state.

Preferably the step of inserting fluid into the or each duct causes the duct(s) to expand.

Preferably the step of inserting fluid into the or each duct comprises substantially filling the duct(s) with fluid.

Preferably method comprises inflating the duct(s) with a fluid.

Preferably method comprises inflating the duct(s) with a working fluid such as air or a coolant fluid.

Preferably the step of inserting fluid into the or each flexible duct comprises pressurising the duct(s).

Preferably the step of inserting fluid into the or each flexible duct comprises pressurising the duct(s) such that fluid pressure within the duct(s) is greater than atmospheric pressure.

Preferably the method comprises inflating the or each flexible duct such that the shape of the or each duct conforms to at least a part of the surface shape of the one or more cell(s). Advantageously, this increases the thermal contact area between the duct and the cells which improves the transfer of thermal energy between coolant in the duct and the individual cells.

Ideally the method comprises securing, by the duct(s), the one or more cells in position. This is advantageous as it removes the requirement for an adhesive to secure the cells in place in the battery pack. Furthermore, when the battery pack is being used in an automotive or aerospace application where it is subject to vibration, the duct may reduce the effects of vibrations on the battery pack by securing the individual cells in place.

Preferably the method comprises positioning one or more support means on the lower clamshell.

Preferably the method comprises positioning one or more support means on the lower clamshell at the peripheral edge of the array of cells.

Preferably the method comprises locating a portion of the duct within a support means to provide support to at least a portion of the duct. Locating the duct in a support means is advantageous as it prevents the duct from kinking as the duct is expanded.

Preferably the method comprises locating a portion of the duct within a recess in the support means when the duct is in a substantially uninflated state. This is advantageous as locating the duct in the recess ensures that there is excess slack in the duct prior to inflation. Providing excess slack in the duct mitigates kinking of the duct during the inflation process.

Preferably the method comprises surrounding at least a part of one or more of the duct(s) with the potting means.

Preferably the method comprises surrounding substantially the or each entire duct with the potting means.

Preferably the method comprises inserting the potting means through the upper clamshell, lower clamshell and/or sidewall(s).

Preferably the method comprises injecting an expandable potting means into the battery pack.

Preferably the method comprises performing a pressure test on the flexible duct prior to inserting the potting means into the battery pack.

Preferably the method comprises inserting foam into the battery pack.

Preferably the method comprises inserting intumescent foam into the battery pack.

Preferably the method comprises inserting polyurethane foam into the battery pack.

Preferably the method comprises inserting a thermosetting plastic, silicone rubber gel or epoxy resin into the battery pack.

Preferably the method comprises inserting the potting means into the battery pack. Preferably the method comprises inserting the potting means into the battery pack while the potting means is in a viscous or liquid state.

Preferably the method comprises inserting fluid into the or each duct prior to inserting the potting means into the battery pack.

Preferably the method comprises pressurising and/or inflating the or each flexible duct prior to inserting the potting means into the battery pack.

Preferably the method comprises curing or hardening the potting means within the battery pack.

Preferably the step of inserting fluid into the or each flexible duct causes the duct(s) to expand into an open configuration.

Preferably the method comprises maintaining, via adhesion to the potting means, the or each duct in the open configuration within the battery pack.

Preferably the method comprises curing or hardening the potting means within the battery pack while the or each duct is in a substantially inflated state and/or an open configuration.

Ideally the method comprises maintaining pressure within the or each duct until the potting means is set or hardened and enters a substantially rigid state. Beneficially, inflating the duct prior to injecting the potting means ensures that the duct has sufficient space to expand once the potting means is set rigid.

Preferably the method comprises expanding the potting means to fill gaps within the battery pack. Advantageously, expansion of the foam means that the foam fills any gaps within the battery pack. This improves the overall mechanical strength of the pack.

Preferably the method comprises thermally insulating the cells by surrounding the cells with a thermally insulating foam. Beneficially thermally insulating foam can prevent a high energy thermal event propagating through the battery pack. Furthermore, thermally insulating foam can reduce the effect of external temperature fluctuations on the battery pack and helps to ensure that the duct is the primary controller of thermal energy within the battery pack.

Preferably the method comprises securing, by the potting means, the duct and/or cells in position within the battery pack.

Preferably the method comprises maintaining, via adhesion to the potting means, the or each duct in an open configuration within the battery pack.

Preferably the method comprises securing, by the potting means, an outer casing to the battery pack. This beneficially negates the requirement for additional fixings or fasteners, reducing the complexity of the battery pack and improving the manufacturing process.

Preferably the method includes electrically connecting the cells to the busbars.

Preferably the method includes electrically connecting the cells to the busbars using ultrasonic bonding, laser welding, ultrasonic welding or resistance welding.

Preferably the method includes electrically connecting the cells to the busbars while the cells are held in place by the flexible duct.

Preferably the method includes electrically connecting the cells to the busbars before the potting material is inserted into the battery pack.

Preferably the method includes inserting the potting means into the battery pack after electrically connecting the cells to the busbars. Advantageously, the potting means serves to protect the aluminium ultrasonic wire bonds from external moisture thereby preventing galvanic corrosion of the wire bonds.

According to a further aspect of the present invention there is provided a method of electrically connecting a cell to a busbar, the method comprising: holding the cell in a desired position using an inflated flexible duct; and providing an electrical connection between the cell and the busbar. Advantageously, the flexible duct can secure the cell(s) in position within the pack, removing the need for glue when electrically connecting the cell(s) to the busbar(s).

Preferably the step of providing an electrical connection between the cell and the busbar comprises ultrasonically bonding a wire to the cell and/or busbar.

Preferably the step of providing an electrical connection between the cell and the busbar comprises ultrasonic bonding, laser welding, ultrasonic welding or resistance welding.

Preferably the step of providing an electrical connection between the cell and the busbar comprises connecting an aluminium wire bond to the cell and/or busbar.

Preferably the method includes potting at least one cell after ultrasonically bonding the cells to the busbars.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The invention will now be described with reference to the accompanying drawings which shows by way of example only one embodiment of an apparatus in accordance with the invention.

Figure 1:
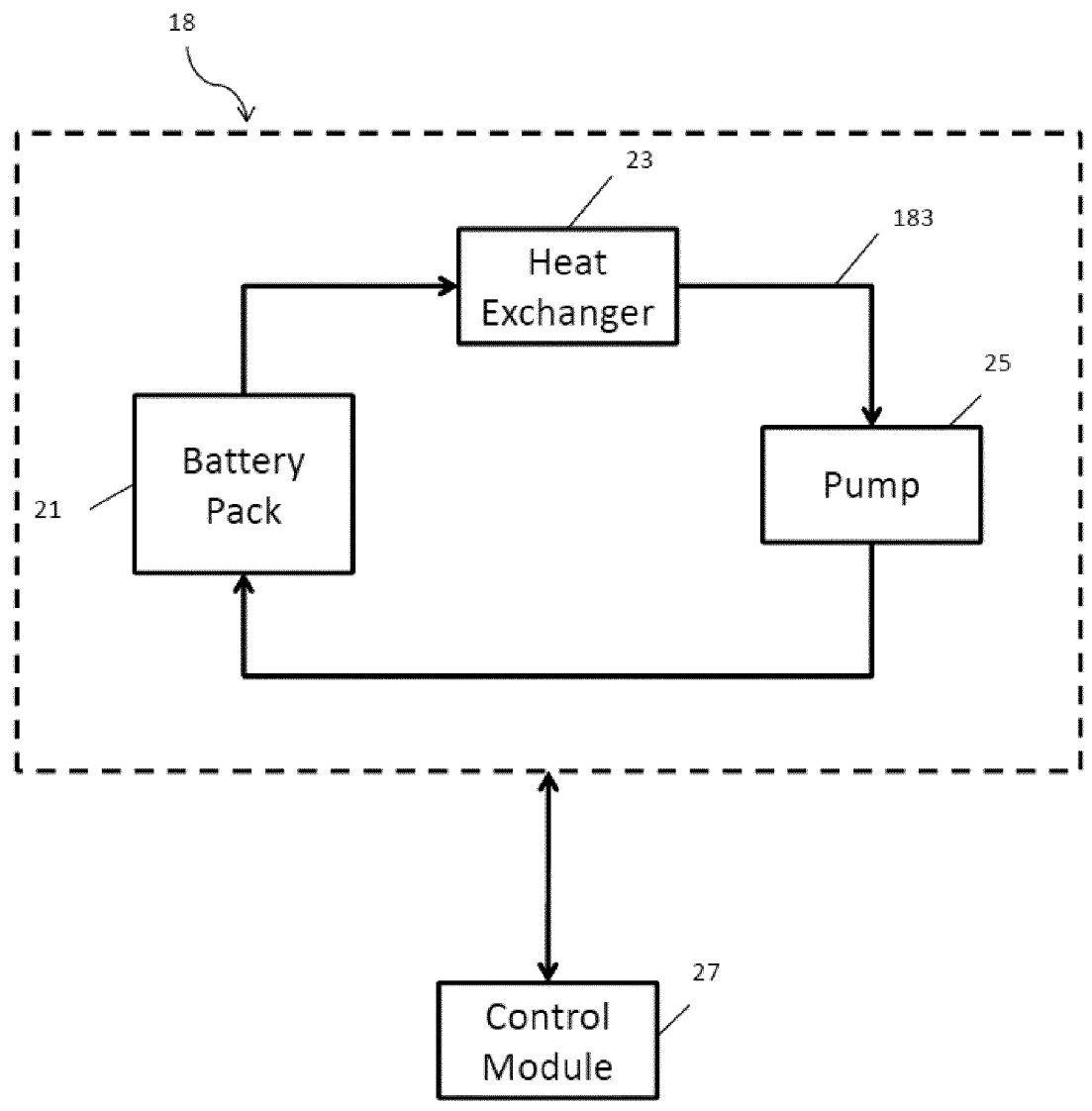
FIG. 1 is a schematic diagram of a thermal management system and control module suitable for use with a battery pack in accordance with the invention.

In FIG. 1 there is shown a thermal management system 18 for a battery pack 21. The term "battery" is used herein to describe one or more individual cells, for example a group of cells arranged in an array. The term "cell" may be used to refer to any variety of cell, including but not limited to, lithium-ion or nickel metal hydride cells. The battery pack 21 comprises one or more cells 30, a flexible duct 50/230 positioned proximally to the surface of at least one of the one or more cells 30 such that heat can be exchanged between the flexible duct 50/230 and at least one of the one or more cells 30 and a potting material 231 adapted to act as a support for at least a part of the duct 50/230. Any number of individual cells may be used to create the desired voltage and capacity of the battery pack 21.

The thermal management system 18 is used to manage the thermal energy within the battery pack 21 so as to maintain the individual cells at an appropriate operating temperature, for example around 25° C. The individual cells within the battery pack 21 generate heat as they are charged and/or discharged. The thermal management system 18 manages the thermal energy within the battery pack 21 by circulating a coolant fluid, such as a glycol-water mix, through a flexible duct that is proximal to the surface of and/or in contact with individual cell(s).

The thermal management system 18 comprises a heat exchanger 23, a pump 25 and a flexible duct (not shown) that carries a coolant through the battery pack 21. The flexible duct is in fluid communication with the heat exchanger 23 and the pump 25 as part of the same coolant circuit 183. The coolant in the thermal management system 18 is pressurised and the pump 25 causes a flow of the coolant through the coolant circuit 183. The pressure of the coolant fluid causes the flexible duct to expand. As the flexible duct expands, it conforms to the undulating surface presented by the shape of the cylindrical cells thereby increasing the surface area of the flexible duct that is in contact with each of the cylindrical cells. This is advantageous as it increases the thermal contact area and contact pressure between the cells and the flexible duct, improving the transfer of thermal energy between the flexible duct and the individual cells.

By regulating the flow rate of coolant within the flexible duct, the pump 25 is configured to maintain the temperature of the battery pack 21 at the desired operating temperature. The heat exchanger 23 can dissipate thermal energy from the coolant when the battery pack 21 requires cooling. The heat exchanger 23 can add thermal energy to the coolant when the battery pack 21 requires heating. A supplementary heating or cooling system may cooperate with the heat exchanger 23 as required.

The thermal management system 18 is connected to a control module 27. The control module 27 receives input signals indicative of the temperature within the battery pack 21. The control module 27 may output a control signal to the thermal management system 18 to regulate the thermal management system 18 in response to the received temperature input signals such that the desired operating temperature is maintained.

Figure 2:
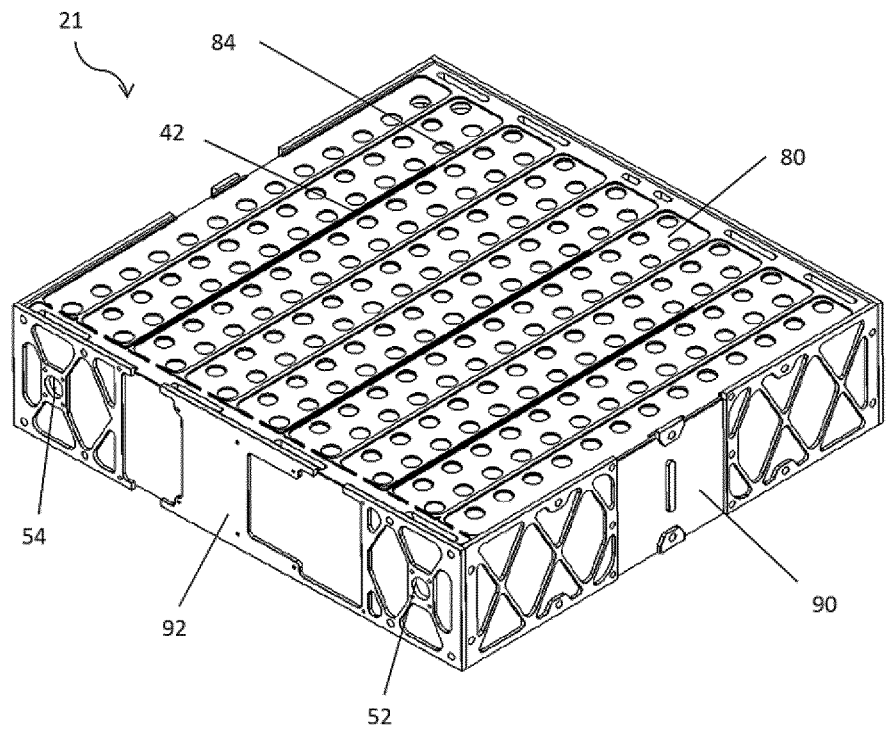
FIG. 2 is a perspective view of a battery pack fitted with upper and lower clamshells and side walls.
Figure 3:
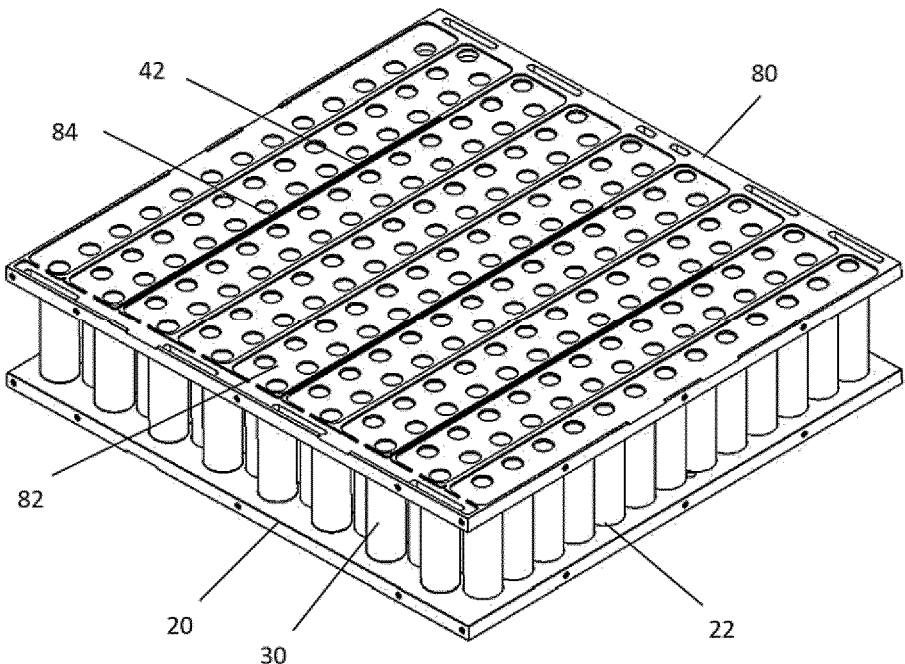
FIG. 3 is a perspective view of the battery pack of FIG. 2 with the side walls removed.

The battery pack 21 comprises an array or matrix of cylindrical cells 30. The cells 30 are sandwiched between lower and upper clamshells 20, 80 that are joined by peripheral side walls 90, 92 shown in FIG. 2. FIG. 3 shows the pack with a number of components removed 50 (including sidewalls 90,92) in order to be able to view the cells 30 within the pack. The cells 30 are aligned along a parallel axes and are arranged in an array of straight, parallel rows. The lower and upper clamshells 20, 80 include bus bars that connect the individual cells 30 electrically to create the battery pack 21.

The skilled reader will appreciate that the cells could be a shape other than cylindrical, for example, cuboidal, prismatic or pouch cells. However, cylindrical cells are relatively low cost and have a high energy density making them an attractive choice for use in battery packs. Furthermore, cylindrical cells are easier to make in mass production than other cell shapes such as pouch cells or cuboidal cells, and are self-supporting (pouch cells require a carrier or support while prismatics are also self-supporting). In example embodiments, the cells are 18650 or 2170 lithium-ion cells.

Figure 4:
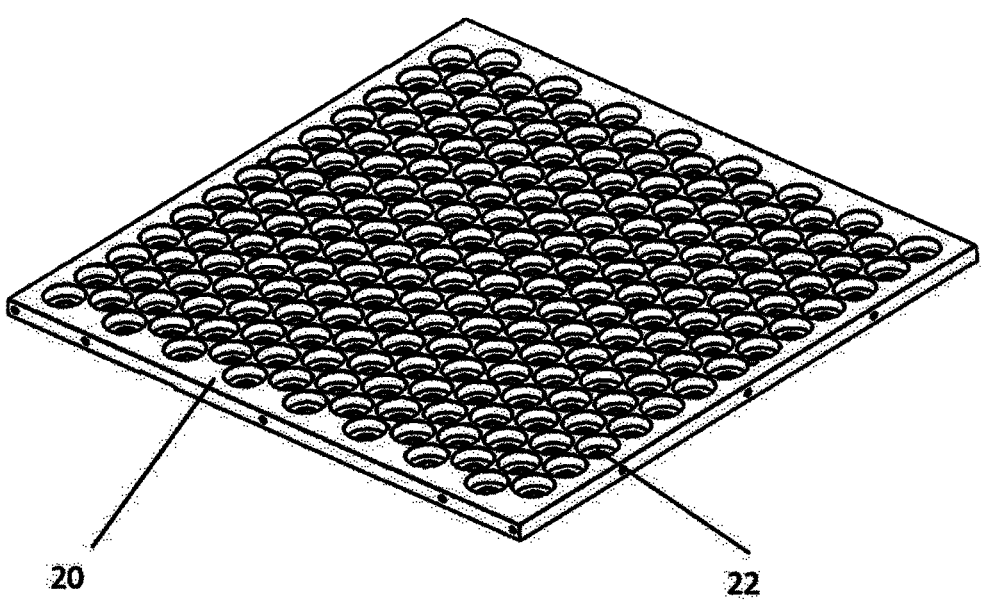
FIG. 4 is a perspective view of a lower clamshell component of the battery pack of FIG. 2.

FIG. 4 shows a perspective view of the lower clamshell 20 of the battery pack 21. The lower clamshell 20 is a plate with an array of recesses in the form of circular sockets 22. The base of each socket 22 comprises an inwardly-projecting flange that surrounds an aperture penetrating the clamshell 20. Each socket 22 is configured to receive an end portion of a respective cylindrical cell 30. In the example shown, the sockets 22 are arranged in an array with sixteen parallel rows wherein each row is thirteen sockets in length. The sockets 22 of each row are staggered with respect to the sockets of the neighbouring row or rows so that most of the sockets 22 are each nested between a pair of sockets 22 of one or two neighbouring rows. This maximises space efficiency and power density but increases the challenge of maintaining the cells 30 at the correct operating temperature.

The skilled reader will appreciate that any number of rows of cells having any appropriate length may be used in battery pack 21. Increasing the number of individual cells 30 in the battery pack 21 increases the overall capacity and/or voltage of the battery pack 21. Furthermore, the cells 30 in the battery pack 21 may be arranged vertically in a vertically stacked battery pack.

Figure 5:
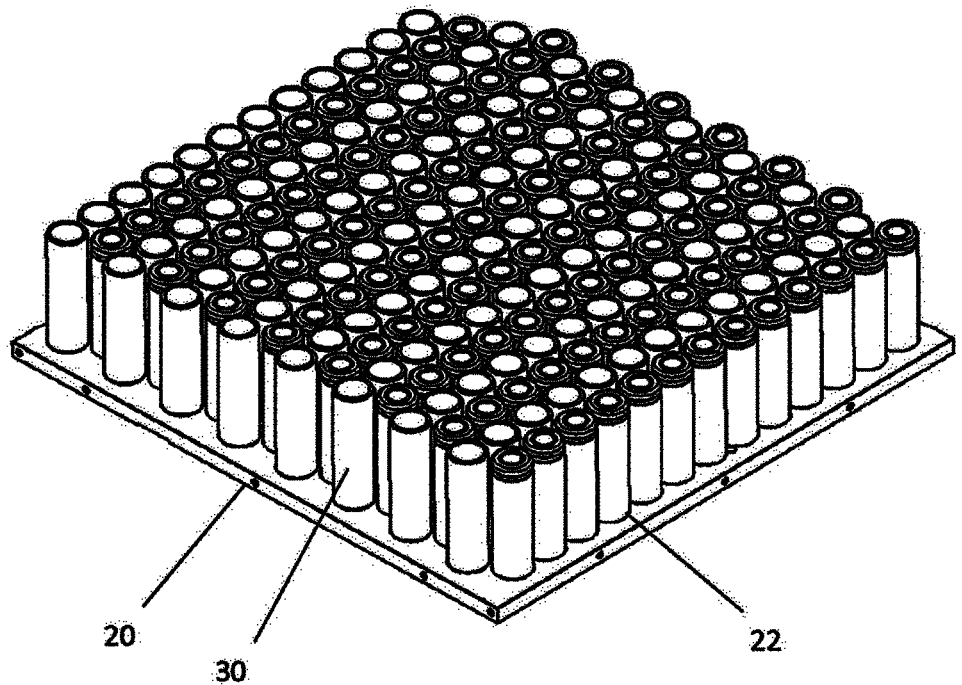
FIG. 5 is a perspective view of the lower clamshell of FIG. 4 fitted with an array of cells.

Manufacture of the battery pack 21 involves providing one or more cells 30, for example the array of cells shown in FIG. 5. In the example embodiment, a plurality of cells 30 are inserted into respective sockets 22 of the lower clamshell 20. The cells 30 are located by the sockets 22 and bus bars positioned on the underside of the lower clamshell 20 (not shown) are connected to the individual cells 30.

Many battery cell manufacturers recommend a minimum cell-to-cell spacing distance of 2 mm to prevent thermal propagation. The skilled reader will recognize that a staggered close-packed array of cylindrical cells is the most volumetrically efficient way to pack cylindrical cells into a given volume whilst maintaining the minimum recommended cell-to-cell spacing. The flexible duct 50 described herein has walls that are between 10 μm and 150 μm thick and the duct 50 can easily fit within the 2 mm staggered channel between adjacent cylindrical cells 30. Prior art thermal management systems typically require increased cell-to-cell spacing to accommodate the duct, increasing the overall pack dimension and reducing volumetric energy density. The present invention offers a significant improvement over the current state of the art in this respect. Furthermore, the present invention allows neighbouring cells 30 to be separated by the minimum spacing limit recommended by cell manufacturers, or any minimum spacing in the range 0.5-5 mm.

Figure 6:
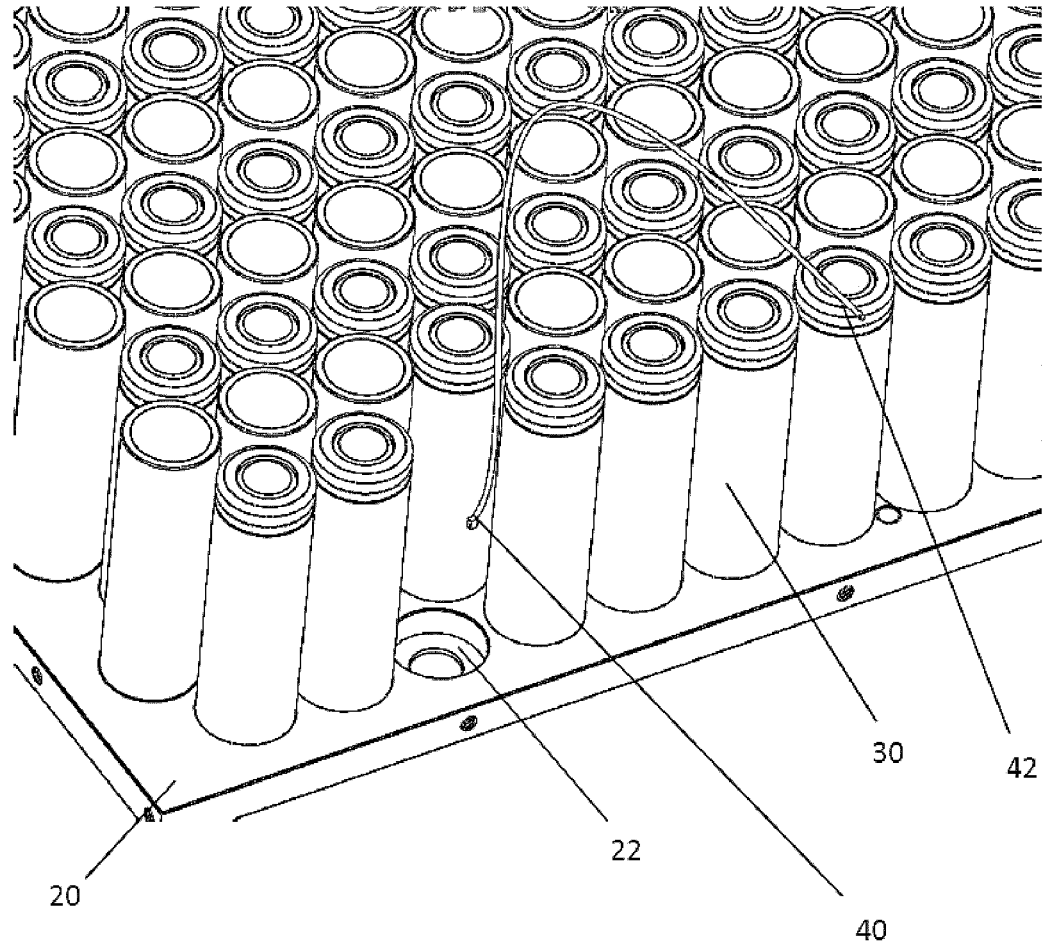
FIG. 6 is an enlarged perspective view showing the array of cells of FIG. 5 fitted with a thermistor.

FIG. 6 shows how temperature sensors 40, for example an array of thermistors, may be connected to a suitably-spaced selection of the cells 30 within the battery pack 21. During assembly the cable 42 attached to the temperature sensor 40 is left free. This is to enable the cable 42 to be secured to the upper clamshell 80 when the upper clamshell 80 is secured to the battery pack 21. The temperature sensors 40 monitor the temperature of the individual cells 30 within the battery pack 21 and provide a temperature reading to a control module 27. If the temperature of the cells 30 deviates from a target operating temperature, the control module 27 may adjust the thermal management system 18 to maintain the target operating temperature.

As will be appreciated by the skilled reader, the present invention can be used in battery packs employing generally straight, parallel, manifold and/or serpentine heat exchangers/ducts. Serpentine ducts are typically utilised with prismatic cells because the planar surfaces of prismatic cells provide a large surface area for thermal contact with the duct. It is easy to wrap a flexible duct around prismatic cells in a serpentine manner while maintaining thermal contact in this way. However, serpentine ducts are susceptible to kinking at points of inflection where the duct reverses or changes direction. Kinking of the heat exchanger can cause blockages and a build-up of pressure in the duct which can hinder or prevent the flow of coolant. Kinking causes the flexible duct 50 to fold in on itself which may result in a blockage within the duct 50. The pressure loss within the system due to kinking over a series of multiple bends may be significant, reducing the overall performance of the thermal management system 18. Furthermore, build-up of pressure can result in stretching and thinning of the duct wall, which may ultimately result in bursting and loss of coolant.

Blockages due to kinking can be overcome by pressurising the coolant fluid within the duct 50 to a sufficient level which forces the flexible duct 50 to an open configuration even at the bends. However, use of a high pressure to overcome kinking may cause the flexible duct 50 to stretch, thin and burst. The pressure required to overcome kinks at each bend in the flexible duct 50 is often in excess of the pressure that the flexible duct 50 can withstand without bursting.

Figure 7:
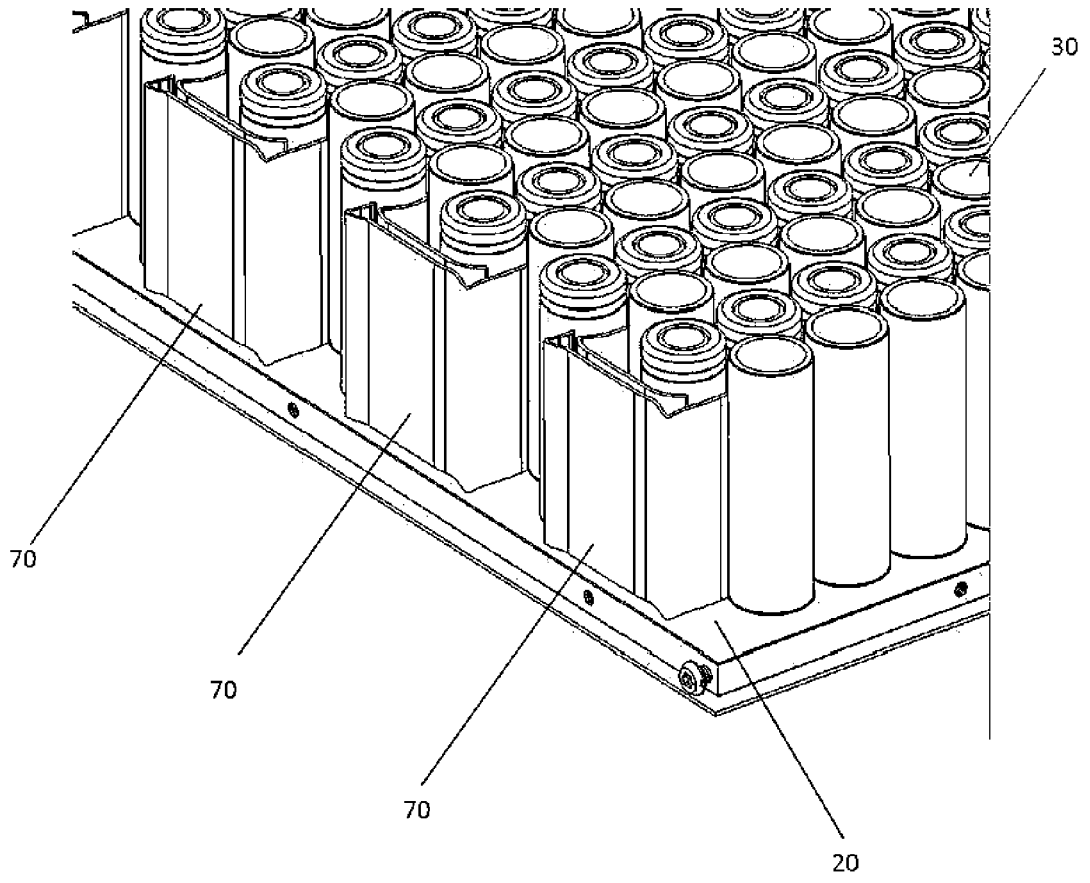
FIG. 7 is an enlarged perspective view showing a support structure fitted to the array of cells shown in FIG. 5.

In embodiments where the flexible duct 50 is to follow a serpentine path between and/or around the cells 30 in the battery pack 21, it is necessary to provide a way to safely support the duct 50 at the corners, to prevent kinking and/or collapse thereof. As shown in FIG. 7, support structures 70 are used within battery pack 21 as a guide at places where the flexible duct 50 changes direction i.e. where it is prone to kinking. The support structures 70 are located at the edge of the battery pack 21 where the flexible duct 50 emerges from the array of cells 30 and reverses direction. FIG. 7 shows the support structures 70 positioned on the battery pack 21 at the periphery of the cells 30. The support structures 70 are positioned along opposing sides of the battery pack 21 at each point where the duct 50 emerges from and re-enters the array of cells 30.

Figure 8:
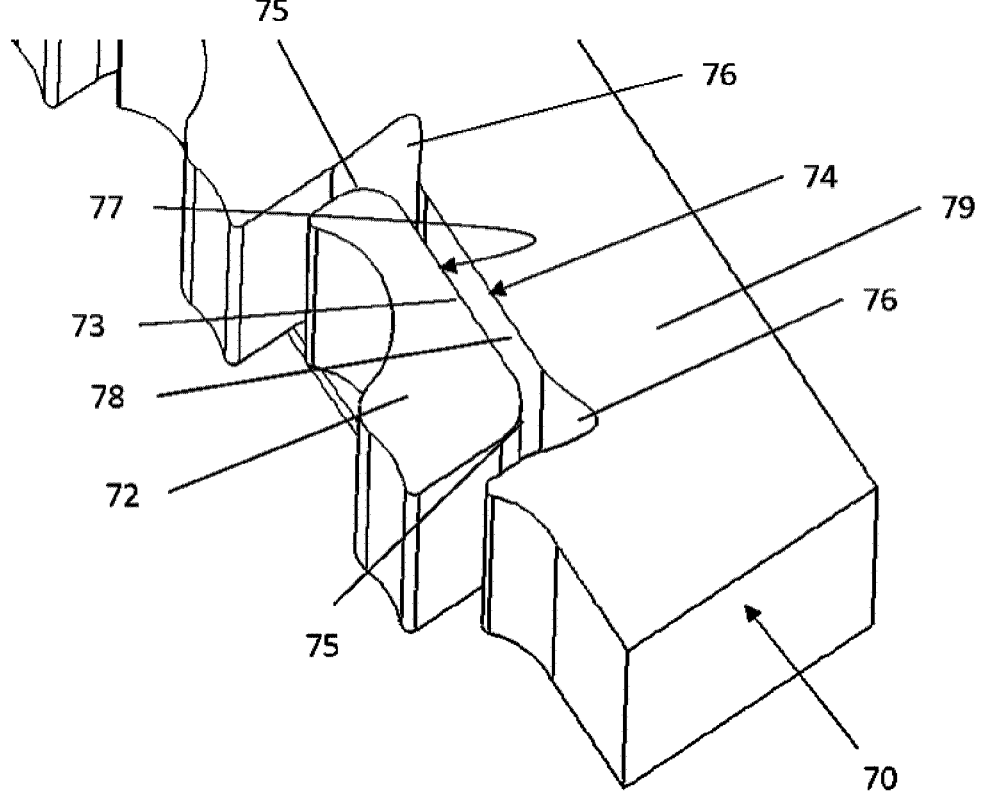
FIG. 8 is a perspective view of a support structure suitable for use with embodiments of the invention.

Respective support structures 70 are positioned at opposing sides of the battery pack 21 to guide the flexible duct 50 where the flexible duct 50 emerges from the array of cells 30 and changes direction. For this purpose, as shown in FIG. 8 the support structure 70 defines a guide path 74 for the flexible duct 50. The guide path 74 is a slot or channel into which the flexible duct 50 may be inserted and that the flexible duct 50 then follows so as to change direction without kinking. The guide path 74 of the support structure 70 is defined between an inner supporting face 77 of an inner guide formation 72 and an outer supporting face 78 of an outer guide formation 79.

The flexible duct 50 can be inserted into the support structure 70 in an uninflated state to follow the guide path 74. The guide path 74 is shaped to accommodate an excess length of the flexible duct 50. Providing the flexible duct 50 with excess length creates some slack that mitigates kinking when the flexible duct 50 is inflated and so comes under tension. The flexible duct 50 is inserted into the guide path 74 in an uninflated state for ease of assembly. However, the skilled reader will appreciate that a small amount of working fluid may be used to pressurise the flexible duct 50 to give the flexible duct 50 some stiffness to aid assembly. The working fluid may be, for example, air or a coolant fluid.

The inner guide formation 72 is dimensioned such that the bend radius of the inner supporting face 77 is large enough to guide the flexible duct 50 smoothly through 180° in successive 90° bends without the duct 50 kinking. As shown in FIG. 8, the inner supporting face 77 comprises a planar elongate facet 73 between two radiused edges 75. The elongate facet 73 serves to straighten and support the flexible duct 50 at the point at which kinking would otherwise be most likely.

Notch-like recesses 76 in the outer guide formation 79 opposite the radiused edges 75 form part of the outer supporting face 78 to accommodate the slack defined by the excess length of the flexible duct 50. Specifically, slack portions of the flexible duct 50 that bend around the radiused edges 75 can be pulled or pushed away from the radiused edges 75 and into the recesses 76. Pressing the flexible duct 50 into the 35 recesses 76 in this way before inflating the flexible duct 50 creates slack in the flexible duct 50 at the radiused edges 75. Providing this slack in the flexible duct 50 before inflation is advantageous as it helps to mitigate kinking of the duct 50 as it is inflated. The notch-like recesses 76 are recesses in the outer supporting face 78 of the outer guide formation 79 and may be any shape suitable for partially receiving the duct 50 to create slack around the radiused edges 75.

As will be understood by the skilled reader, where the battery pack 21 does not include substantial bends and/or is not likely to kink (such as where a non-serpentine or generally straight duct is used) then support structures are generally not required.

Figure 9:
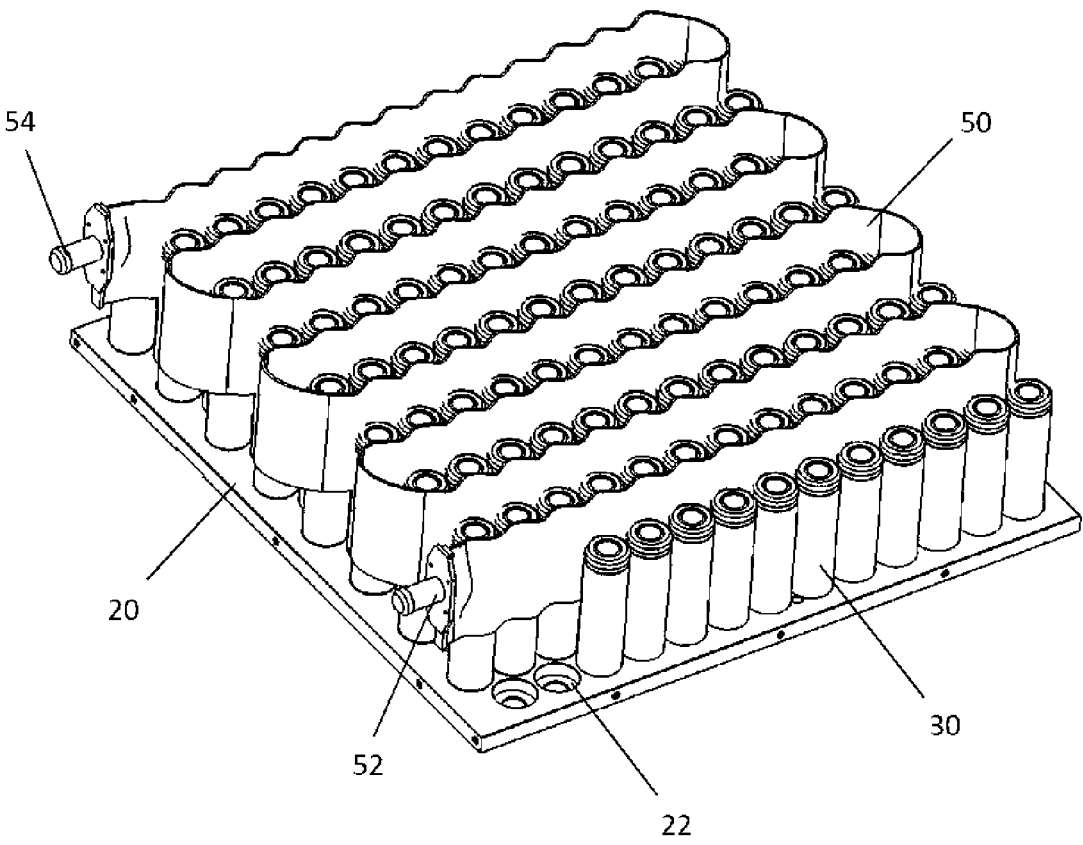
FIG. 9 is a perspective view of a flexible duct being fitted to the array of cells shown in FIG. 5.

Manufacture of the battery pack 21 involves positioning the flexible duct 50 proximally to the surface of at least one of the one or more cells 30 such that heat can be exchanged between the flexible duct 50 and at least one of the one or more cells 30. FIG. 9 shows a flexible duct 50 being inserted into the array of cells 30. The duct 50 is arranged in a serpentine manner within the battery pack 21 such that a coolant fluid 20 is carried through the battery pack 21. Specifically, the duct 50 has a series of generally straight limbs that extend between adjacent rows of the cells 30. The limbs of the duct 50 alternate with bends where the duct 50 emerges from the array of cells 30 and reverses in direction to extend along and between the next pair of rows of cells 30.

The serpentine arrangement of the flexible duct 50 ensures that the flexible duct 50 is in thermal contact with all of the cells 30 within the battery pack 21. The flexible duct 50 may, for example, be an inflatable ribbon of plastics material, such as polyester, LDPE, LLDPE, HDPE or any other plastics material or polymer-based material that is flexible and able to withstand the pressure of the coolant. An inflatable plastics material is advantageous as the material is intrinsically electrically insulating, lightweight and does not corrode or chemically interact with a coolant such as a glycol-water mix.

The flexible duct 50 is fitted with an inlet 52 and an outlet 54. In use, the inlet 52 and outlet 54 are connected to the pump 25. The pump 25 is configured to induce a flow in the coolant within the flexible duct 50 such that the coolant flows through the flexible duct 50. Pressurising the coolant within the thermal management system 18 to a pressure above atmospheric pressure causes the flexible duct 50 to expand and conform to the shape of the cylindrical cells 30. Details of how the coolant is pressurised are provided in further detail below.

As best viewed in FIG. 9, nozzles are connected to the flexible duct at the inlet 52 and the outlet 54 respectively. The nozzles are configured to be attached to the coolant loop 183 of the thermal management system 18 such that coolant fluid may be conveyed around the thermal management system 18. The region of the flexible duct 50 connected to the inlet and outlet nozzles may be reinforced to prevent the duct 50 bursting or expanding excessively. The duct 50 may be reinforced by manufacturing the end of the duct 50 from a stronger plastics material or by providing an external sleeve of material over the flexible duct 50 to prevent the flexible duct 50 expanding in the region of the inlet 52 or outlet 54.

Figure 10:
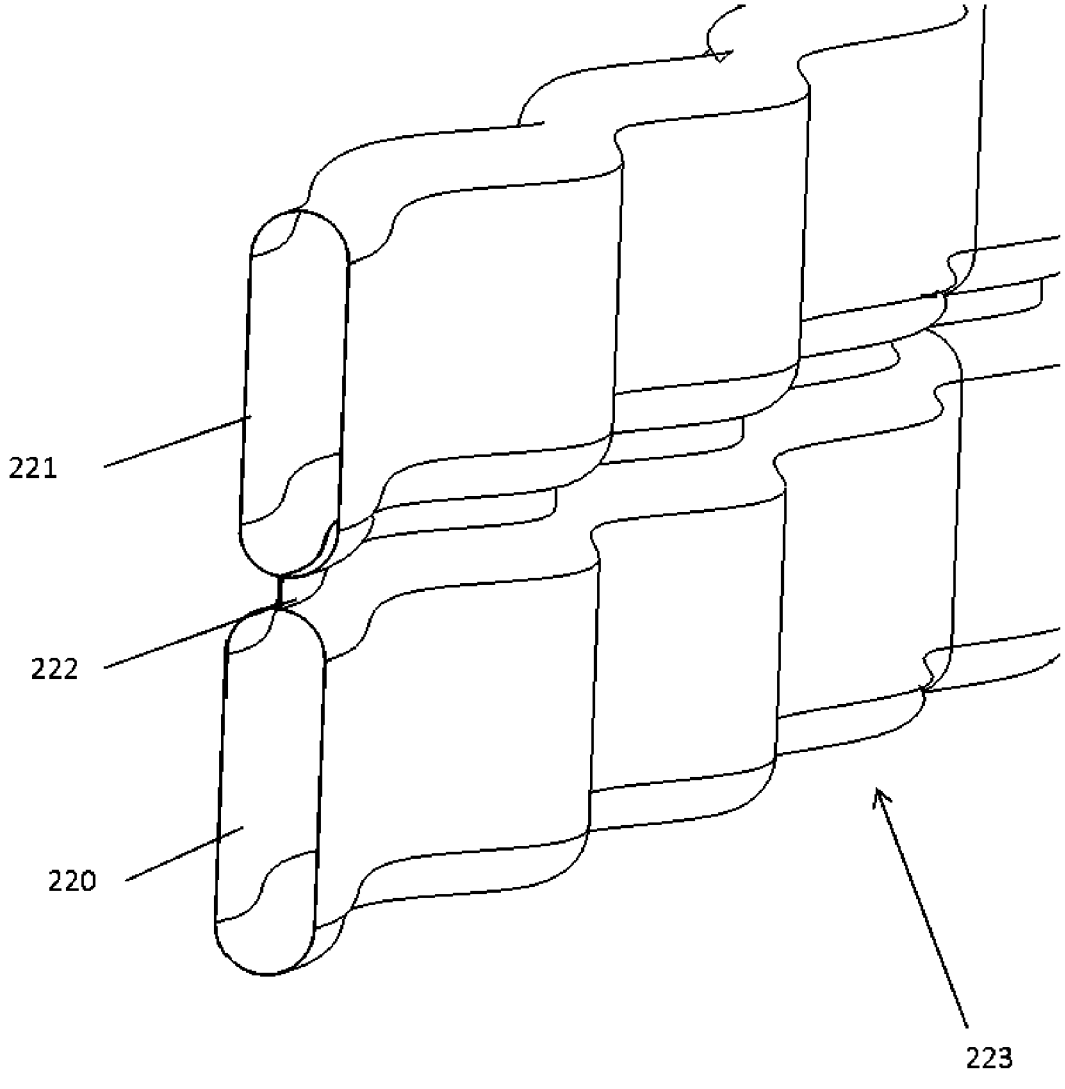
FIG. 10 is a perspective view of a multi-lumen flexible duct suitable for use with embodiments of the invention.

The duct 50 shown in FIG. 9 is a single lumen expandable duct 50. However, turning to FIG. 10, a multi-lumen expandable duct 223 may be used in the thermal management system 18. The multilumen duct 223 comprises an inlet passage 221 and an outlet passage 220. The inlet passage 221 and outlet passage 220 are configured to carry a coolant fluid through the battery pack 21. This is advantageous for use in large battery packs 21 as it improves the distribution of thermal energy throughout the battery pack 21. In large battery packs 21 the single lumen duct 50 may not be able to provide sufficient cooling or heating to cells 30 located downstream in the duct 50. This problem is overcome through the use of a multi-lumen duct 223 which provides a more uniform temperature distribution throughout the battery pack 21.

The multi-lumen duct 223 is manufactured from the same plastics material as the single lumen duct 50. To create the multi-lumen duct 223, a seal 222 is created between the inlet and outlet passages 221, 220. The seal 222 may be created by melting the plastics material of the duct 223 to create a bond. The operation of the multi-lumen duct 223 is substantially the same as the single lumen duct 50 except the multi-lumen duct has a bi-directional coolant flow. The multilumen duct 223 may be located within the supporting structure 70 in a similar manner to the single lumen duct 50. Furthermore, the multi-lumen duct 223 may be pressurised by the coolant fluid as described above such that the duct 223 expands to conform to the surface shape of the cells 30. To implement the multi-lumen duct 223 the skilled reader will appreciate that a manifold would be located at an end of the duct 223 opposing the inlet to the duct 223. The manifold would allow coolant fluid to transition from the inlet passage 221 to the outlet passage 220 thereby facilitating a bi-directional coolant flow in the duct 223.

Figure 11:
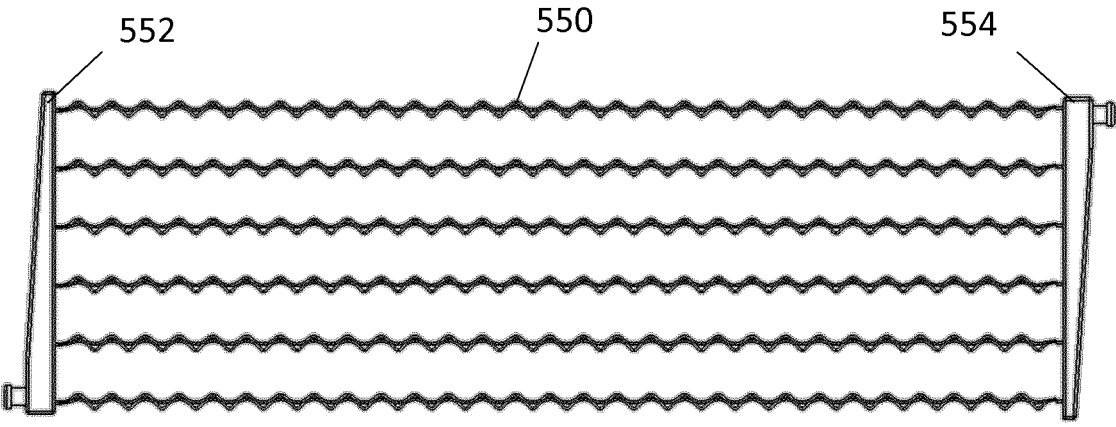
FIG. 11 is a top view of a heat exchanger comprising a plurality of flexible ducts suitable for use with embodiments of the invention.
Figure 12:
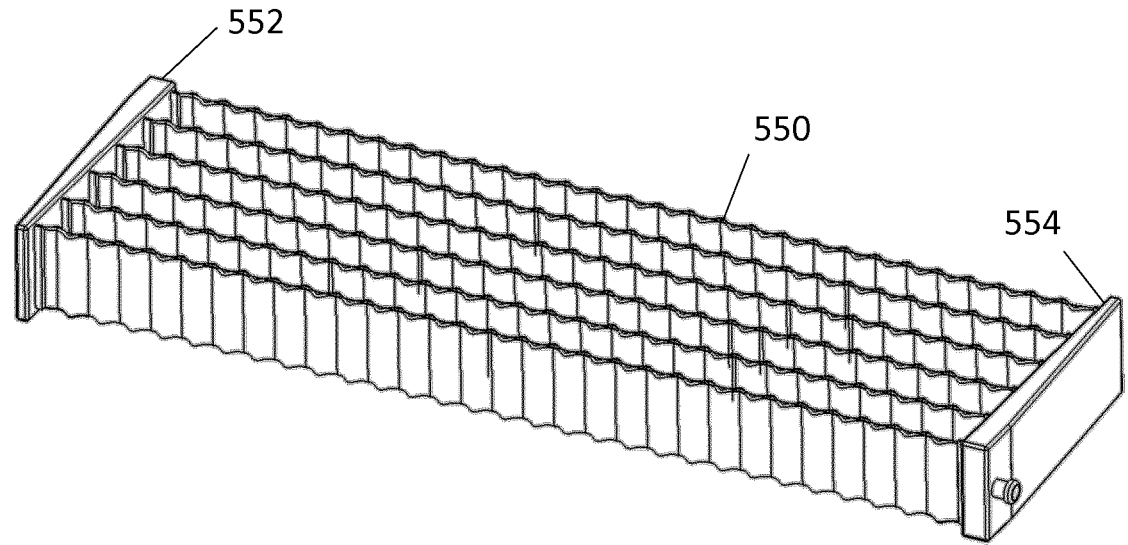
FIG. 12 is a perspective view of the heat exchanger shown in FIG. 11.
Figure 13:
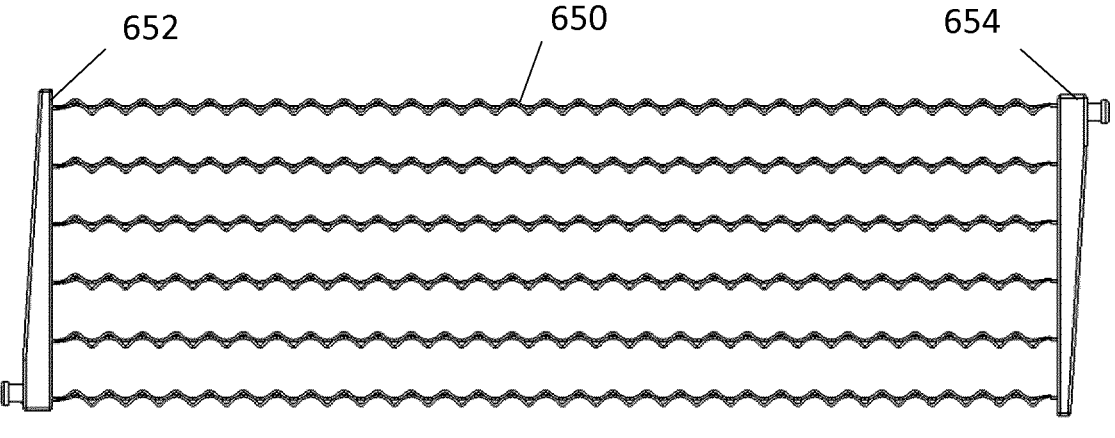
FIG. 13 is a top view of a heat exchanger comprising a plurality of flexible multi-lumen ducts suitable for use with embodiments of the invention.
Figure 14:
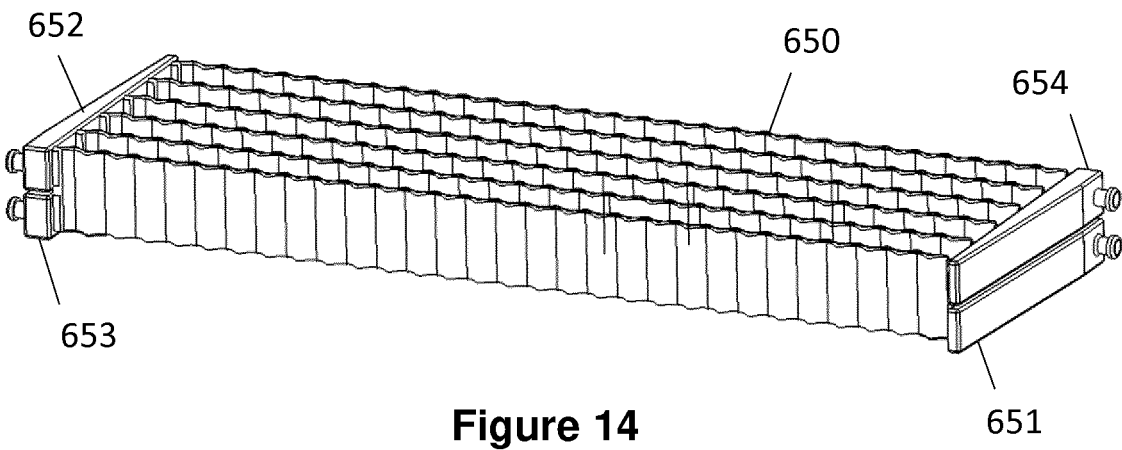
FIG. 14 is a perspective view of the heat exchanger shown in FIG. 13.
Figure 15:
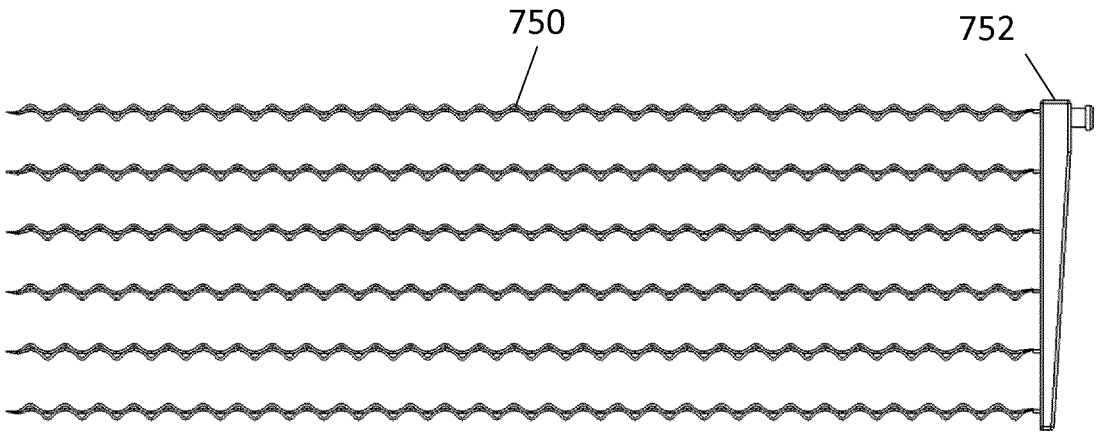
FIG. 15 is a top view of a heat exchanger comprising a plurality of flexible multi-lumen ducts suitable for use with embodiments of the invention.
Figure 16:
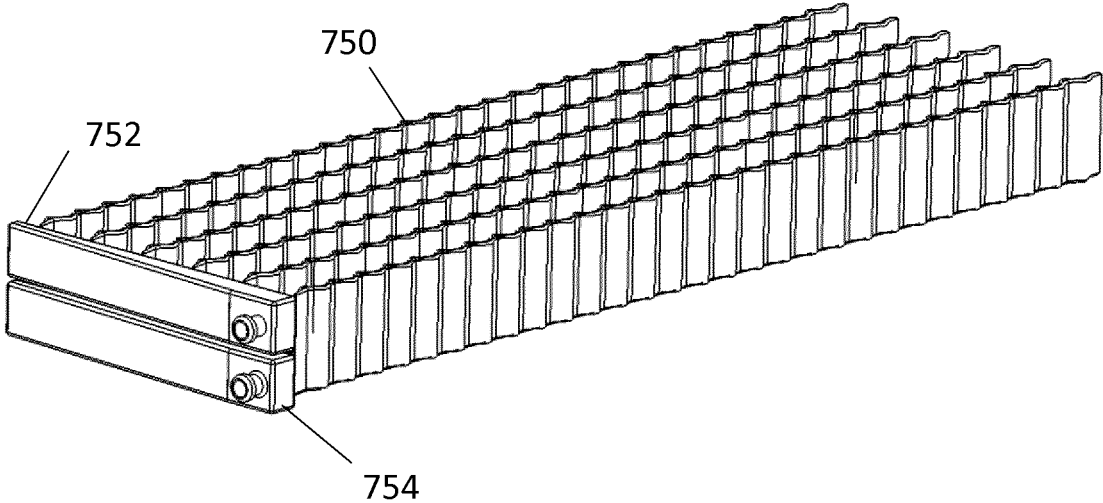
FIG. 16 is a perspective view of the heat exchanger shown in FIG. 15.

While the embodiment shown in FIG. 9 uses a serpentine duct 50, the skilled person will appreciate that other duct geometries are possible and can be used to implement the invention. FIGS. 11 and 12 show a plurality of substantially straight, single-lumen ducts 550 in their expanded state (for clarity the cells are not shown). Each of the individual straight ducts 550 are connected via inlet 552 and the outlet 554 and are to be located between adjacent rows of cells. FIGS. 13 and 14 show a plurality of substantially straight, multi-lumen ducts 650 in their expanded state (for clarity the cells are not shown). A first lumen of each duct 650 is connected to inlet 652 and outlet 654. A second lumen of each duct 650 is connected to an inlet 651 and an outlet 653. FIGS. 15 and 16 show a plurality of substantially straight, multi-lumen ducts 750 in their expanded state (for clarity the cells are not shown). Each of the individual straight ducts 750 are connected via inlet 752 and the outlet 754 and are to be located between adjacent rows of cells. The lumens in each of the straight ducts 750 are connected at the end of the duct 750 which is opposite to the inlet and outlet.

Returning to the embodiment of FIG. 9, after the flexible duct 50 has been located in position within the battery pack 21 and between/adjacent to the cells 30 the construction of the battery pack housing is completed. The housing comprises lower and upper clamshells 20, 80 that are joined by four peripheral side walls including sidewalls 90, 92 shown in FIG. 17. Side wall 92 comprises two apertures corresponding to the inlet 52 and the outlet 54 of the flexible duct 50. The inlet 52 and outlet 54 align with the respective apertures in the side wall 92 so that the flexible duct 50 may be connected to the pump 25 and the heat exchanger 23 of the thermal management system 18.

As will be appreciated by the skilled person, it is possible for one or more of the sidewalls 90, 92 to be attached to the lower clamshell 20 before the cells 30 are inserted into respective sockets 22 of the lower clamshell 20 and/or before the flexible duct 50 is inserted between and around cells 30.

The upper clamshell 80 is placed on top of the array of cells 30 within the battery pack 21 after the flexible duct 50 has been positioned as described above. Bus bars (not shown) are located within recesses 82 on top of the upper clamshell 80 to connect the individual cells 30 electrically. The aforementioned wires 42 connected to the thermistors 40 are fed through the upper clamshell 80 and run along grooves 84 located on the upper surface of the upper clamshell 80.

Figure 17:
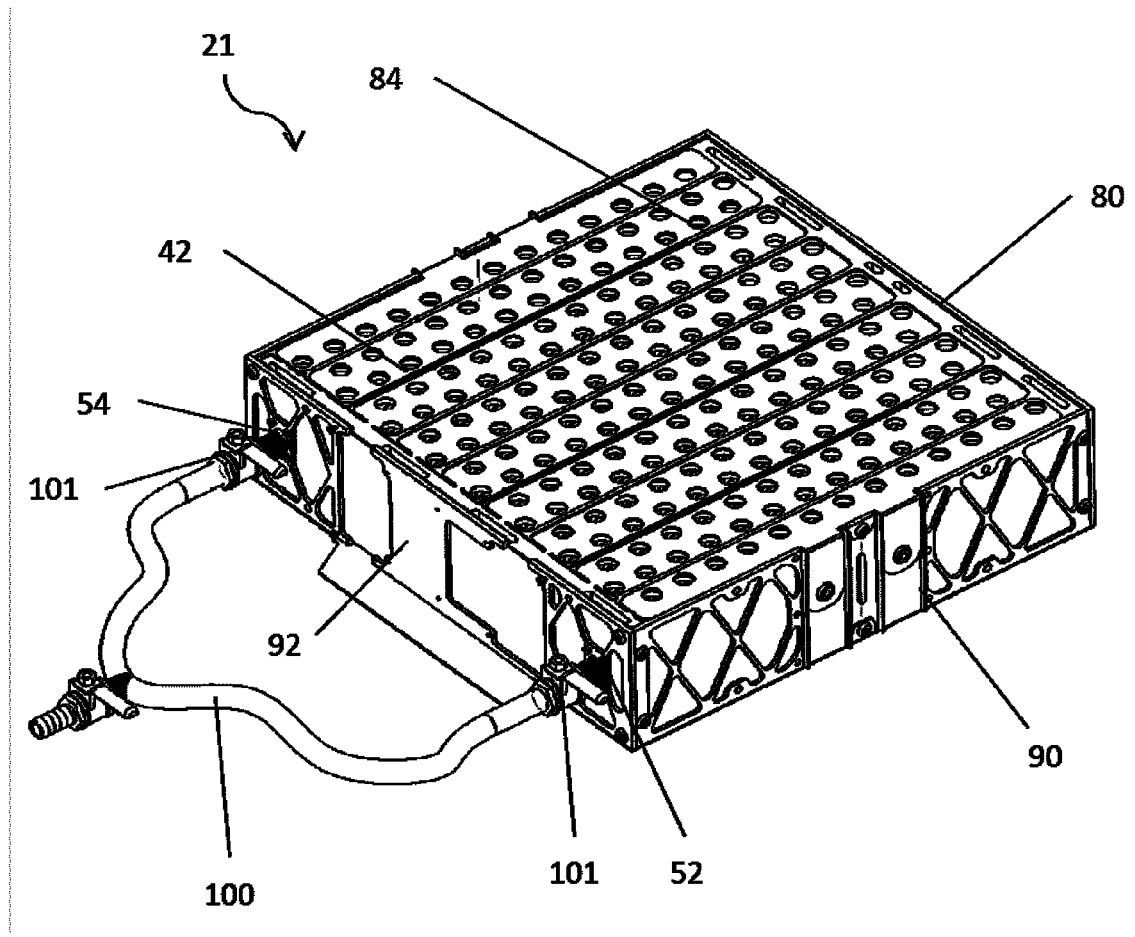
FIG. 17 is a perspective view of a battery pack fitted with upper and lower clamshells, side walls and a pressurisation manifold.

As shown in FIG. 17, a pressurisation manifold 100 is coupled to the flexible duct 50 of the battery pack 21 via the inlet 52 and the outlet 54. Shut-off valves 101 act between the pressurisation manifold 100 and the inlet 52 and the outlet 54. The pressurisation manifold 100 pressurises the flexible duct 50 by delivering a working fluid such as air to the flexible duct 50 under higher-than-ambient pressure. For example, the pressurisation manifold 100 pressurises the flexible duct 50 to a gauge pressure of between 0.5 bar and 1.5 bar during the assembly process. This causes the flexible duct 50 to expand into an inflated state.

Pressurising the flexible duct 50 in this way causes the duct 50 to expand and conform to the shape of the cells 30 and in particular to the undulating shape of the rows of cells 30. The pressure of the flexible duct 50 may be monitored for a pre-defined period of time during the manufacturing process to ensure that there are no leaks in the flexible duct 50.

During assembly, the shut-off valves 101 may be closed and the pressurisation manifold 100 removed from the battery pack 21. This is advantageous as assembly of the battery pack 21 may be continued with the flexible duct 50 in an inflated state. It is beneficial to carry out the steps of wiring the battery pack 21 and adding the potting material to the battery pack 21 when the flexible duct 50 is in an expanded state. This is because the flexible duct 50 secures the cells 30 in position when in the expanded state (as discussed below) and because adding the potting material when the flexible duct 50 is in the unexpanded state would prevent the duct 50 from subsequently being inflated.

Figure 18:
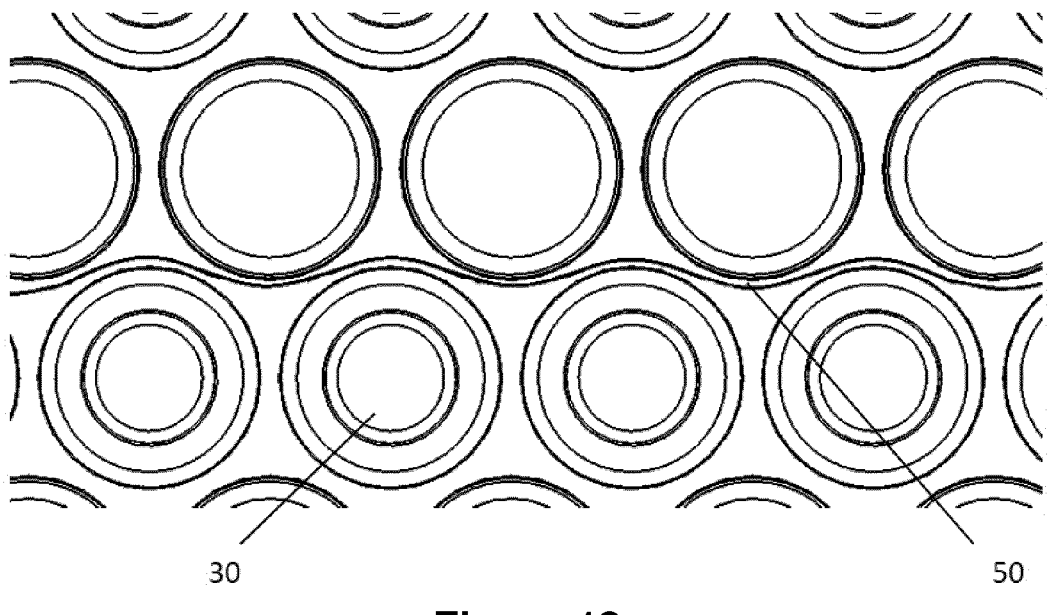
FIG. 18 is a cross-sectional view showing the flexible duct located between the cells in an uninflated state.

FIG. 18 shows the flexible duct 50 in an unexpanded state when it is inserted into the battery pack 21 between adjacent rows of cells 30. The flexible duct 50 is substantially straight when in the unexpanded state such that the area of contact between the flexible duct 50 and each cell 30 is relatively small, being essentially tangential to the surface of the cell, and extending as a narrow band along each cell 30 without significant circumferential extension.

Figure 19:
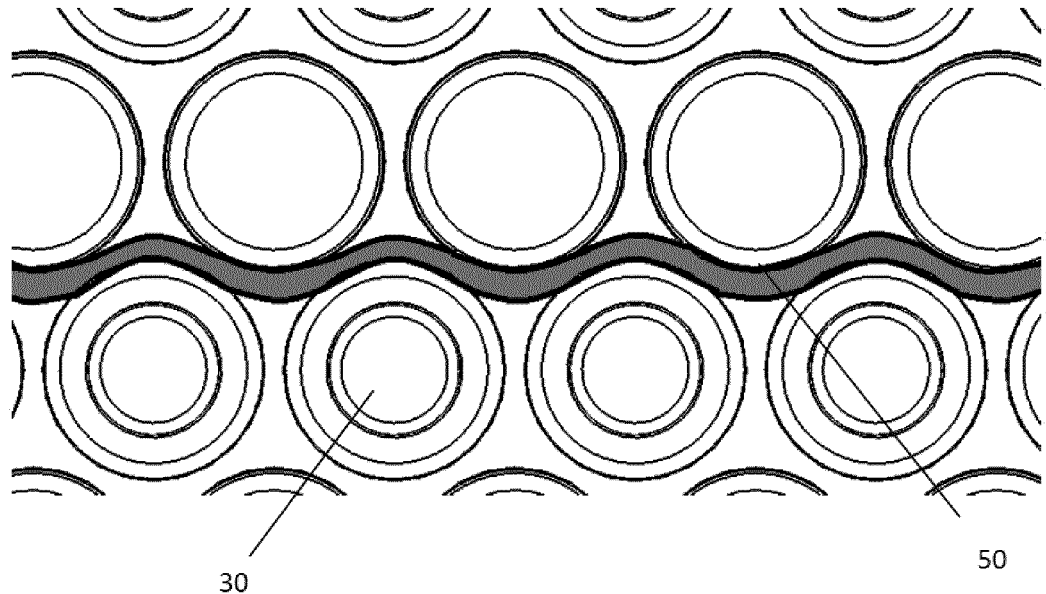
FIG. 19 is a cross-sectional view of the flexible duct located between cells in an inflated state.

FIG. 19 shows the flexible duct 50 in an expanded, operating state. When the flexible duct 50 is pressurised by the working fluid before use, or by the coolant during use, the flexible duct 50 expands and conforms to the undulating shape of the rows of cells 30. As can be seen in FIG. 19, when in the expanded state, the flexible duct 50 more fully conforms to the shape of the individual cells 30 thereby increasing the thermal contact area between the duct 50 and the cells 30. Pressurised coolant within the duct 50 also increases the contact pressure between the duct and each individual cell 30, improving the thermal coupling therebetween. Furthermore, the natural flow impingement causes strong mixing of coolant flows within the duct 50.

Figure 20:
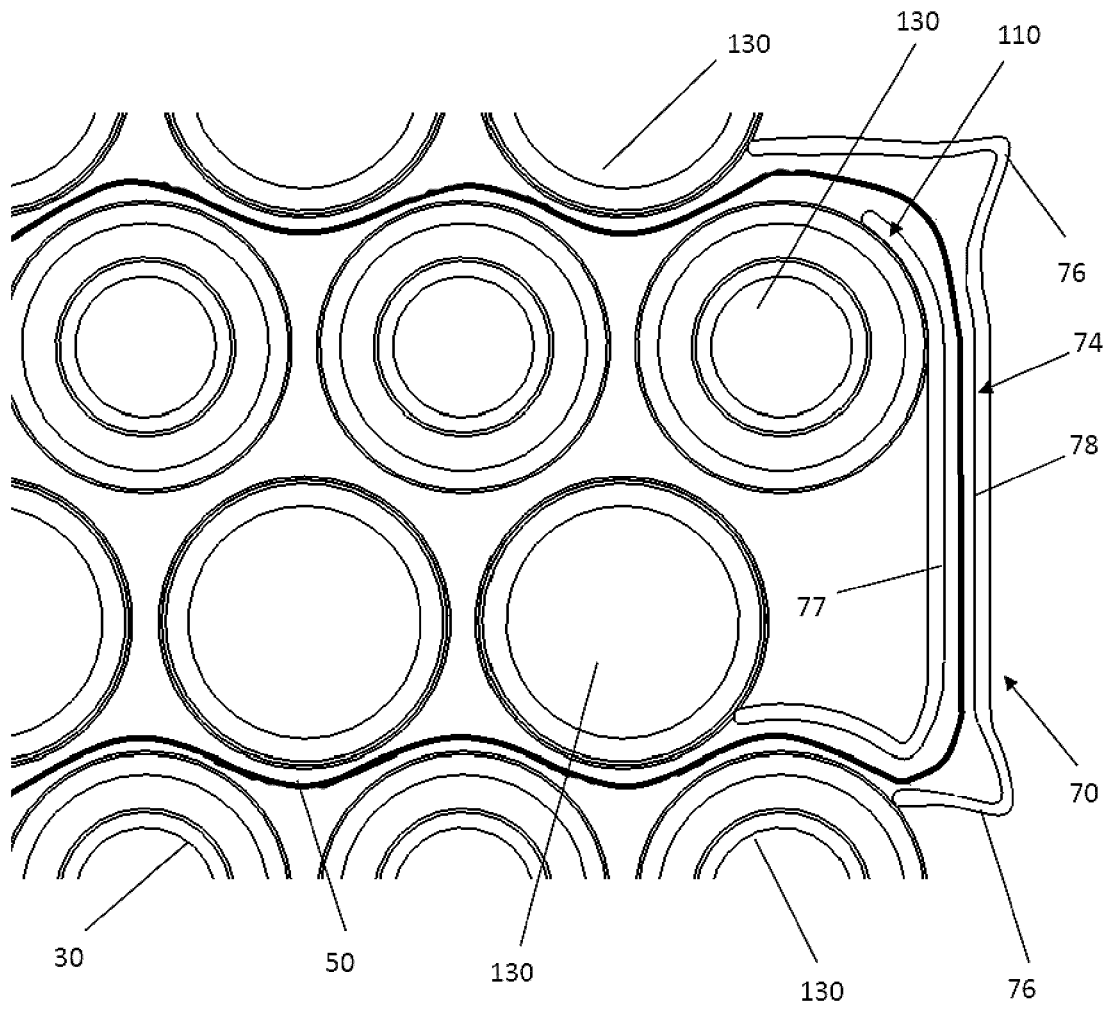
FIG. 20 is an enlarged plan view of the support structure and the flexible duct in an uninflated state.
Figure 21:
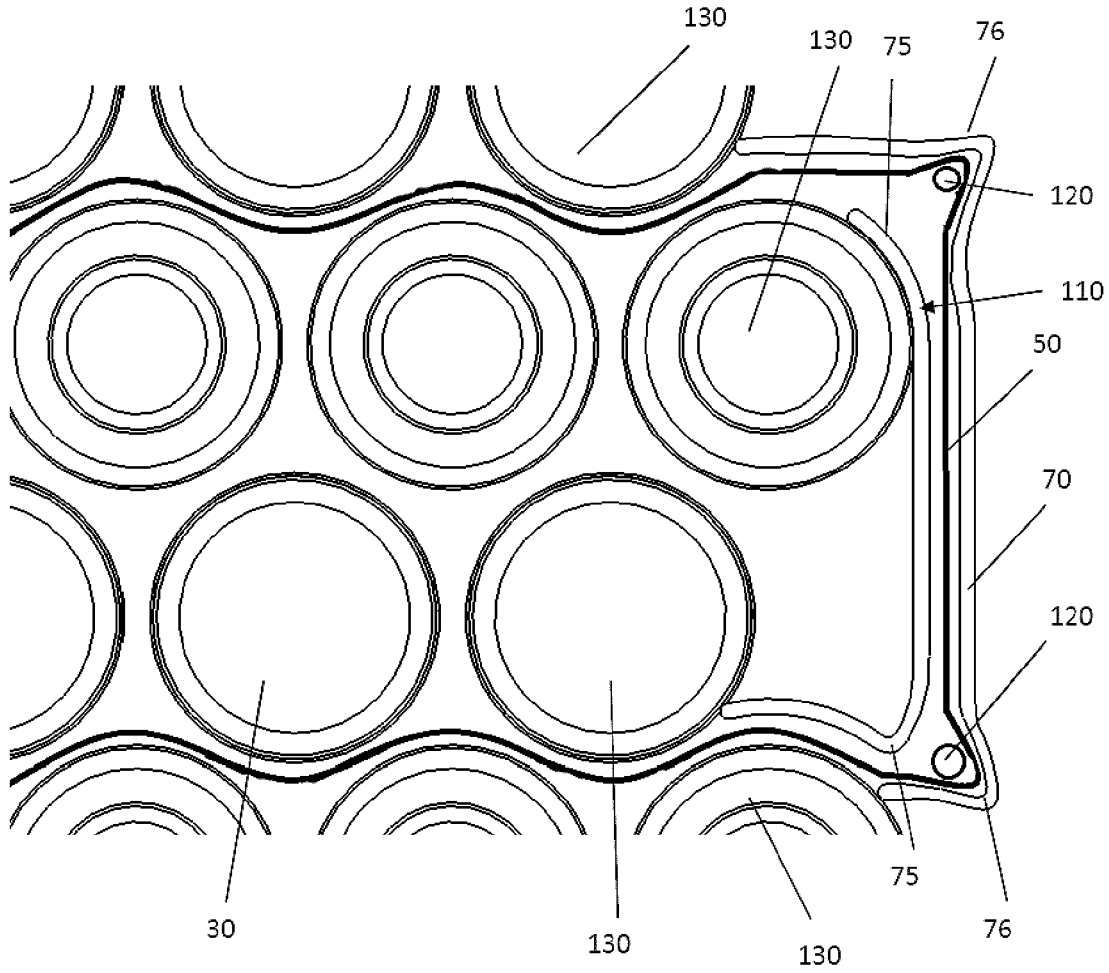
FIG. 21 is an enlarged plan view of the support structure and the flexible duct being located in position.
Figure 22:
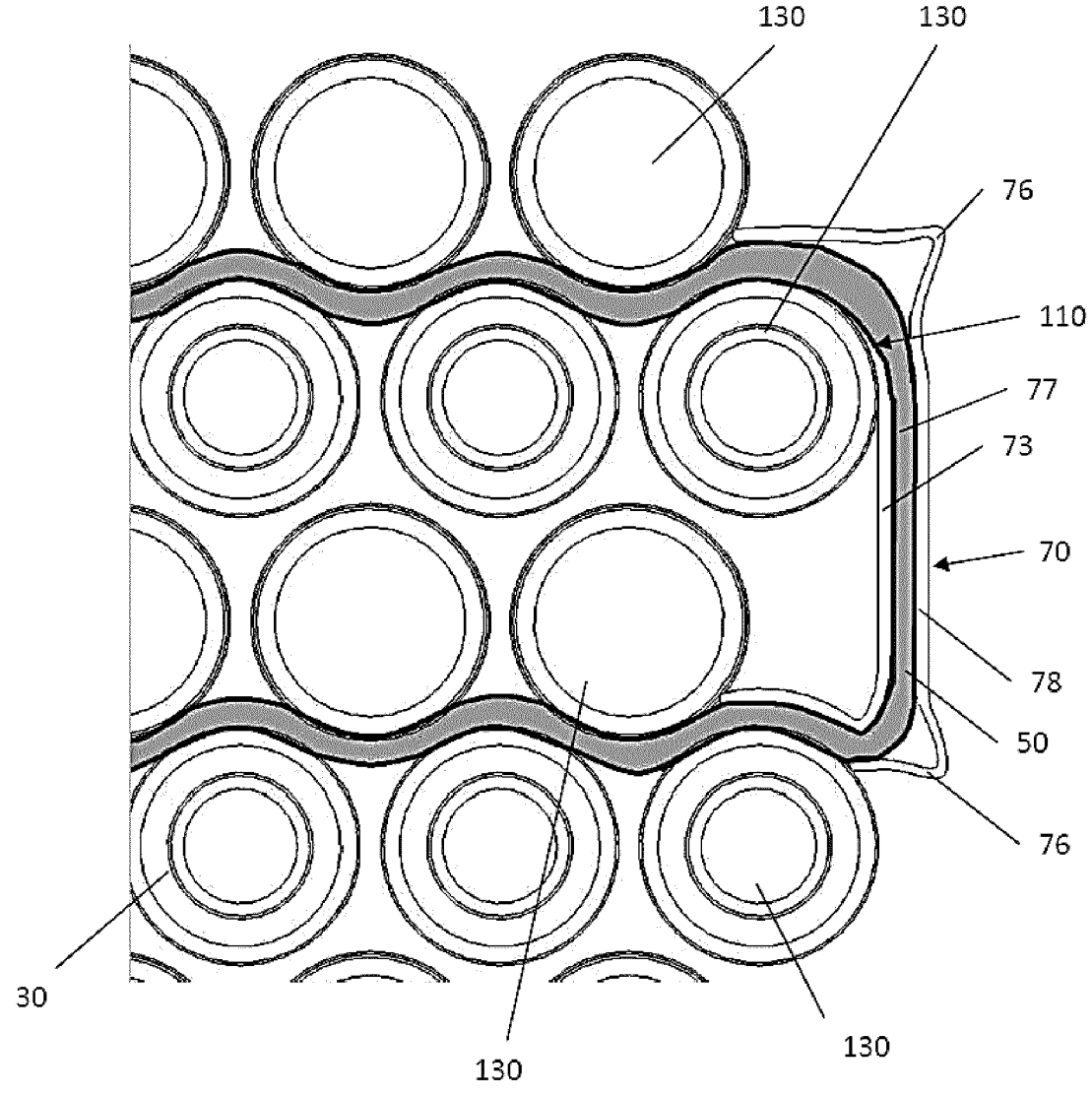
FIG. 22 is an enlarged plan view of the support structure and the flexible duct in an inflated state.

FIG. 20 shows the flexible duct 50 in an uninflated state located within the guide path 74 of the supporting structure 70. FIG. 21 shows the slack in the flexible duct being taken into the recesses 76. FIG. 22 shows the flexible duct 50 in an inflated state within the support structure 70 and cells 30.

When the flexible duct 50 is first located within the guide path 74 an elongate rod or tool 120 may be used to locate the flexible duct 50 within the recesses 76 as shown in FIG. 21. The elongate rod or tool 120 pushes the flexible duct 50 within the recesses 76 such that slack is created in the flexible duct 50. In particular the slack is created in the region of the radiused edges 75 such that when the flexible duct 50 is inflated, thus coming under tension, the flexible duct 50 does not kink.

When the duct 50 is in the inflated state, tension in the flexible duct 50 takes up any excess slack in the duct 50. As the excess slack is taken up in the duct 50, the flexible duct 50 is pulled from the recessed notches 76 as shown in FIG. 22. In the inflated state the duct 50 contacts the radiused edges 75 on the inner supporting face 77 and is supported by the elongate facet 73.

The support structure 70 is dimensioned such that the cells 130 positioned on the end of each row of the array have substantially the same thermal contact area with the duct 50 as cells located in the centre of the array. This is advantageous as it promotes a more even temperature distribution throughout the battery pack 21 thereby extending the life of the battery pack 21. The support structure 70 achieves this by shielding or thermally insulating a portion of the end cells 130 from thermal contact with the duct 50 such that the duct 50 has substantially the same thermal contact area with the end cells 130 as cells 30 located within the array.

As shown in FIGS. 20 to 22, the ends of the outer supporting face 78 abut the end cells 130 such that the outer bend of the guide path 74 is defined by the outer supporting face 78 from the point the duct 50 emerges from the array to the point that the duct 50 re-enters the array. The outer supporting face 78 prevents the duct 50 expanding such that it wraps around the exterior of the cells 130 which would cause the end cell 130 to have an increased thermal contact with the duct 50.

Similarly, one end of the inner supporting face 77 abuts an end cell 130. The end of the inner supporting face 77 in abutment with the end cell 130 provides support to the duct 50 thereby preventing the duct 50 bulging and wrapping around the end cell 130. The other end portion 110 of the inner supporting face 77 partially follows the surface of another end cell 130 such that the end portion 110 wraps around the end cell 130 to form a thermal insulating barrier. The end portion 110 of the inner supporting face 77 partially wraps around the exterior surface of the end cell 130 such that when the duct 50 is located within the guide path 74 the duct 50 does not contact the end cell 130 in the region of the end portion 110. The skilled reader will understand that the extent to which the portion 110 extends around the end cell 130 is dependent upon the thermal contact between the duct 50 and the cells 30. The portion 110 extends around the end cell 130 sufficiently to ensure that the duct 50 does not contact the end cell 130 more than any other cell 30 within the array.

The support structure 70 serves to mitigate kinking of the duct 50 at points where the duct 50 emerges from the array and reverses direction. The guide path 74 defines a channel for the duct 50 to follow from the point the duct 50 emerges from the array to the point that the duct 50 re-enters the array. The guide path 74 prevents excessive bulging and/or collapse of the duct 50.

The sockets 22 on the lower and upper clamshells 20, 80 are dimensioned to have a clearance fit relative to the individual cells 30. This is advantageous as it enables the individual cells 30 to easily be located in the sockets 22 by an automated manufacturing process; however, the cells 30 may move within their respective sockets 22 which is undesirable when wiring the battery pack 21 using e.g. ultrasonic wire bonding to connect the cells 30 to the bus bars. This is because both the cells and the bus bars should be mechanically stiff for the ultrasonic wire bonding process to create a high quality electrical connection therebetween. To overcome this problem, it is known in the prior art to glue the individual cells 30 in position to ensure a strong mechanical connection between the individual cells 30 and the lower and upper clamshells 20, 80. However, this is an additional and inefficient step in the manufacturing process. Pressurising the flexible duct 50 not only causes the flexible duct 50 to expand and conform to the shape of the individual cells 30 but it also secures the individual cells 30 in position within the sockets 22. Thus the inflated flexible duct 50 can be used to secure the cell(s) 30 in position while forming an electrical connection between the cell(s) and busbar(s). Securing the cells 30 in position using an inflated duct 50 negates the requirement for gluing the individual cells 30 in position on the clamshell 20, 80.

The individual cells 30 may be wired via an automated ultrasonic wire bonding process. This process is performed on both the lower and upper clamshells 20, 80. The skilled person will understand that the individual cells 30 may be wired via any other suitable process. Furthermore, the control module 27 is connected to the bus bars at this stage in the assembly process. An in-line electronic test of the battery pack 21 may be carried out at this stage in the assembly process as a quality assurance step to ensure that the connections have been produced correctly prior to continuing the assembly process. It is desirable to perform the wire bonding process when the flexible duct 50 is in an expanded state such that the individual cells are secured in position as this improves the quality of the bond. Furthermore, the potting material serves to protect the aluminium ultrasonic wire bonds from external moisture thereby preventing galvanic corrosion of the wire bonds.

Manufacture of the battery pack 21 involves providing a potting material adapted to act as a support for at least a part of the duct 50. In the preferred embodiment the potting material is intumescent foam such as expandable polyurethane foam although other potting materials such as thermosetting plastic, silicone rubber gel or epoxy resin may be used.

The potting material is injected into the battery pack 21 while in its liquid or viscous state after the housing has been completed and after the wire bonding has been completed. In the case of an expandable potting material such as intumescent foam, the expandable potting material expands to fill the gaps within the battery pack 21 such that the flexible duct 50 and individual cells 30 are surrounded by the potting material. Once fully expanded, the volume within the battery pack housing is substantially filled with the cells 30, support structures 70, duct 50 and potting means. The expandable potting material expands from a liquid state and sets rigid after injection such that it can mitigate against and/or prevent thermal propagation through the battery pack

21. The expandable potting material may be polyurethane foam that is designed to char when exposed to high temperatures, for example up to 1000° C. This is advantageous as the char layer of pure carbon acts as an excellent thermal insulator thereby preventing the propagation of a high energy thermal event through the battery pack 21. In this way the battery pack is fire-retardant.

The potting material is injected into the battery pack 21 when the duct 50 is in an inflated state. The potting material sets rigid around the inflated duct 50 such that a cavity is provided within the potting material that the duct 50 is located within. The cavity provides total external support to the duct 50 thereby preventing the duct 50 being over inflated and/or bursting. The potting material sets substantially rigid to secure the duct 50 in position and also acts as an external support to the duct 50 to provide mechanical support to the duct 50. The polyurethane foam is advantageous since it is extremely lightweight due its high air content when compared to other potting materials such as water based or silicone gels.

After the potting material has cured or hardened, the or each duct 50 is maintained in its open configuration via adhesion to the potting material. This means that the working fluid may be removed from the interior of the duct 50 and the duct would still be in its open configuration.

Use of potting material such as foam within the battery pack 21 also thermally insulates the battery pack 21 from the external environment. This is advantageous as it means the thermal management system 18 is the prominent thermal regulator of the battery pack 21 (as opposed to external environment factors) making overall control of the thermal management system 18 easier. Insulating the battery pack 21 improves the thermal "endurance" of the battery pack 21, reducing the requirement for intermittent cooling of the battery pack 21 when the battery pack 21 is not being used in sustained low or high temperature environmental conditions. Foam within battery pack 21 also provides increased vibration and mechanical protection to the internal components of battery pack 21. The foam sets rigid meaning that it serves to secure the cells 30 and flexible duct 50 in position within the pack 21. This is particularly advantageous in automotive applications where the battery pack 21 is subject to periods of sustained vibration.

Figure 23:
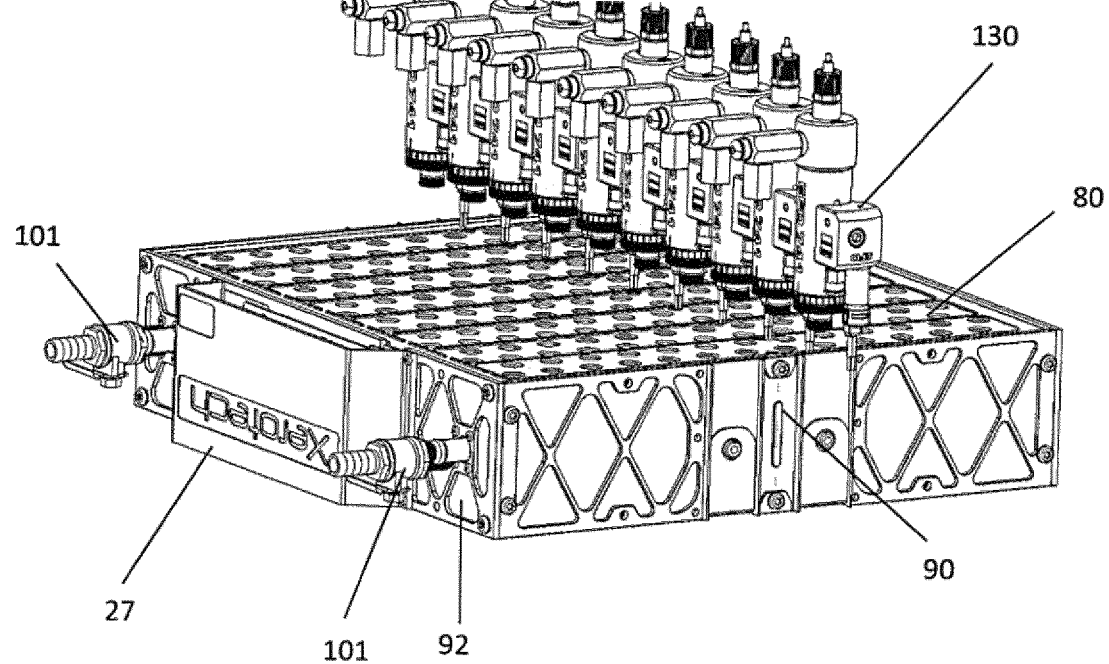
FIG. 23 is a perspective view of the battery pack being filled with a potting material in an automated process.

FIG. 23 shows the battery pack 21 being injected with the potting material. The potting material may be injected into the battery pack 21 by an automated process via holes in the clamshell 20, 80 using the nozzles 130. The potting material flows into the battery pack 21 as a liquid thereby flooding the battery pack 21. The potting material then sets rigid over time. As shown in FIG. 23 the control module 27 is secured to the side wall 92 and the control module 27 is also flooded with potting material.

Once the battery pack 21 is flooded with the potting material, the lower and upper 50 clamshells 20, 80 are covered by an outer casing. The outer casing is a sheet metal component that is positioned on the battery pack 21 prior to the potting material setting rigid. In the case of intumescent foam as potting material, as the foam sets it expands thus contacting the outer casing. The potting material acts as an adhesive once it is cured thereby securing the outer casing to the battery pack 21. In an embodiment the outer casing is secured to the battery pack 21 by external fasteners and the potting material. In another embodiment the outer casing is secured to the battery pack 21 by the hardened/set/cured potting material only.

Figure 24:
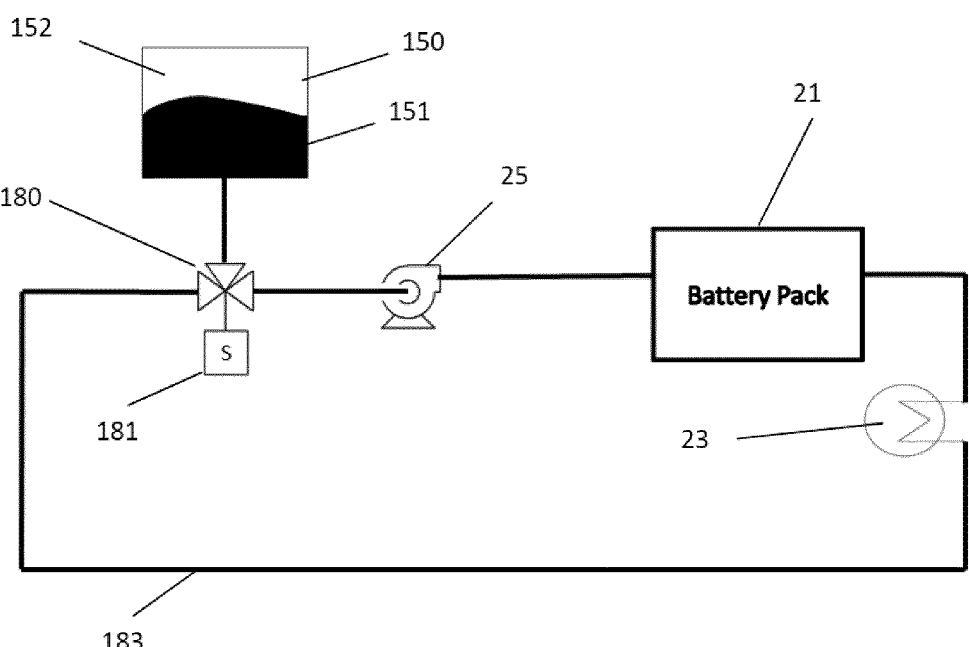
FIG. 24 is a schematic diagram of a thermal management system suitable for use with embodiments of the invention comprising a reservoir.
Figure 25:
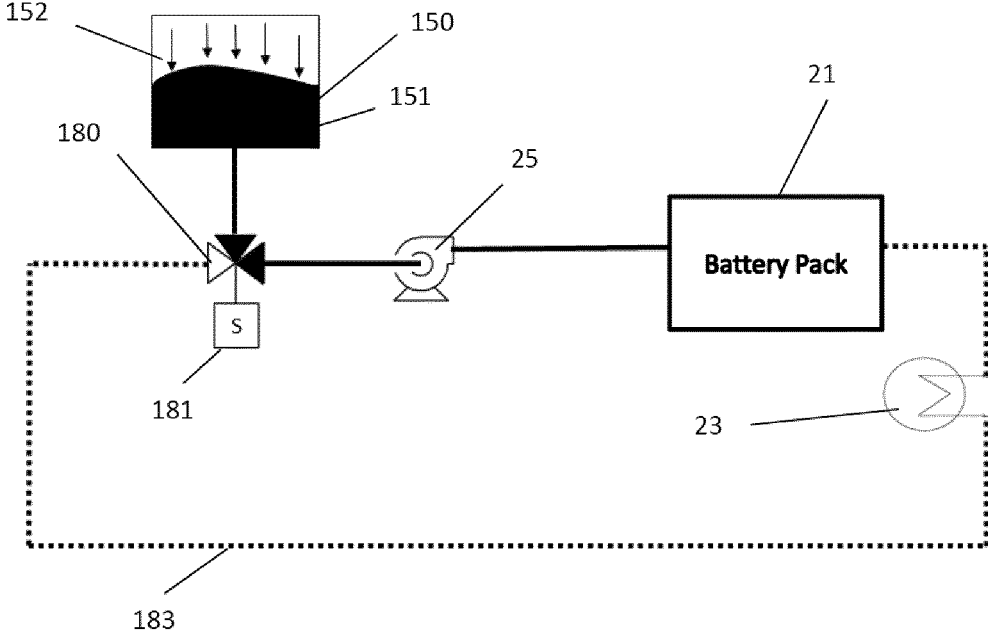
FIG. 25 is a schematic diagram of the thermal management system of FIG. 24 being pressurised.
Figure 26:
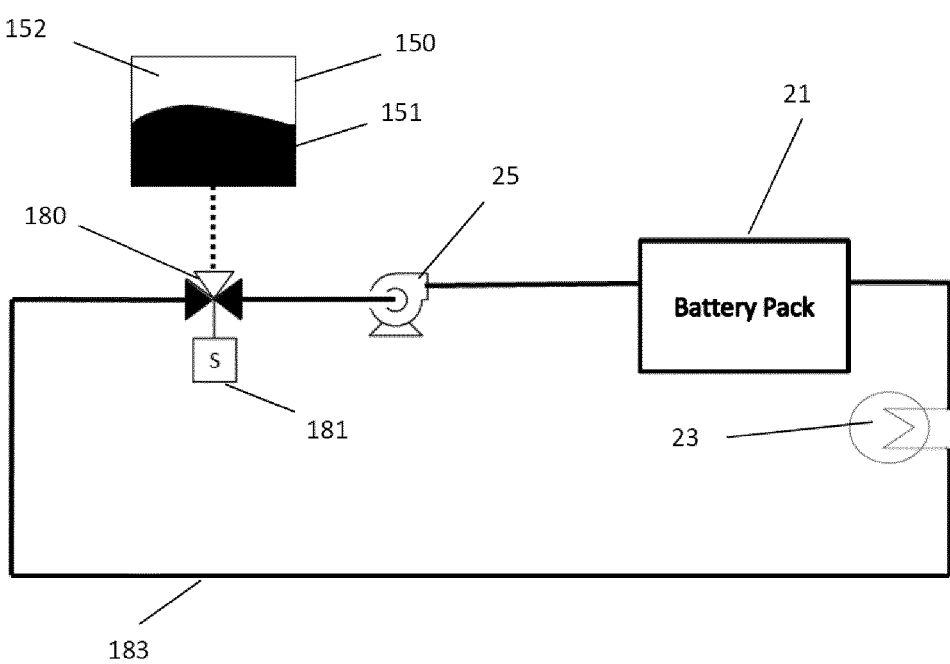
FIG. 26 is a schematic diagram of the thermal management system of FIG. 24 in an operating state.

FIGS. 24 to 26 show schematic diagrams of the thermal management system 18. The thermal management system 18 comprises a reservoir 150, the pump 25, the heat exchanger 23, the battery pack 21, a three-way control valve 180 and a switching module 181 connected to the control module 27. The reservoir 150 is a tank configured to store coolant fluid 151. The reservoir 150 is in selective fluid communication with the coolant loop 183 such that fluid within the reservoir 150 may be introduced to the coolant loop 183 to pressurise the coolant loop 183. Similarly, coolant fluid may be removed from the coolant loop 183 to reduce the pressure in the coolant loop 183 if required. The reservoir 150 may further be in communication with the atmosphere such that a pocket of air 152 may be located above the coolant 151 when the reservoir 150 is not full. If the level of coolant 151 within the reservoir 150 drops below a threshold value a user of the battery pack 21 may introduce coolant 151 into the reservoir 150.

The three-way control valve 180 is controllable to selectively engage the reservoir 150 in fluid communication with the coolant loop 183. Furthermore, the three-way control valve 180 may be actuated to close the coolant loop 183 such that coolant cannot flow around the coolant loop 183 when the battery pack 21 is turned off.

The reservoir 150 is partially filled with coolant fluid 151 and partially filled with air 152. The reservoir 150 may be positioned in fluid communication vertically above the coolant loop 183 such that coolant within the coolant loop 183 is under a hydrostatic pressure by the pressure of the coolant 151 in the reservoir 150. Alternatively, the air 152 within the reservoir 150 may be pressurised such that a force is exerted on the coolant 151 within the reservoir 150 which in turn applies a force on the coolant within the coolant loop.

FIG. 24 shows the thermal management system 18 in a non-operating state where the three-way control valve 180 is closed. When in the non-operating state the control valve 180 is closed and pressure within the closed coolant loop is maintained at the desired operating pressure.

Turning to FIG. 25, the thermal management system 18 may be pressurised by running a pressurisation cycle wherein coolant fluid 151 from the reservoir 150 is drawn into the coolant loop 183 to increase the pressure of the coolant in the loop 183. When running the pressurisation cycle the switching module 181 actuates the three-way control valve 180 to open two of the three valves such that a flow path is provided between the reservoir 150 and the pump 25. The third valve member is closed such that the coolant loop 183 is blocked. Simultaneously, the pump 25 is driven to create a pressure differential across the pump 25 such that fluid is drawn from the reservoir 150 and into the coolant loop 183. Drawing fluid 151 from the reservoir 150 into the coolant loop 183 causes the pressure within the coolant loop 183 to increase. Pressurising the duct via the reservoirs makes it self-supporting thus eliminating any of the hydrodynamic pressure loss from the pump and greatly reducing the pressure drop within the cooling system.

A pressure sensor (not shown) monitors the pressure within the coolant loop 183 during the pressurisation cycle and when the desired pressure within the coolant loop 183 is achieved the control valve 180 is actuated such that the path between the reservoir 150 and the coolant loop is closed. Simultaneously the pump 25 may be stopped being driven such that the thermal management system 18 is switched to a non-operating state or alternatively the pump 25 may be driven and the control valve 180 actuated to operate the thermal management system 18 in an operating state.

FIG. 26 shows the thermal management system 18 in an operating state. In the operating state the control valve 180 is actuated such that a flow path is provided across the control valve 180 to allow coolant fluid to circulate through the coolant loop 183. When in the operating state the reservoir 150 is not in fluid communication with the coolant loop 183. The control module 27 may monitor the pressure of the coolant within the coolant loop 183 to ensure that the coolant pressure is maintained at a desired operating pressure. If the pressure within the coolant loop 183 drops below a threshold value a pressurisation cycle may be run to increase the pressure within the coolant loop 183 to the target operational pressure, as described above. The target operational pressure may be between 0.5 bar and 1.5 bar for example.

Figure 27:
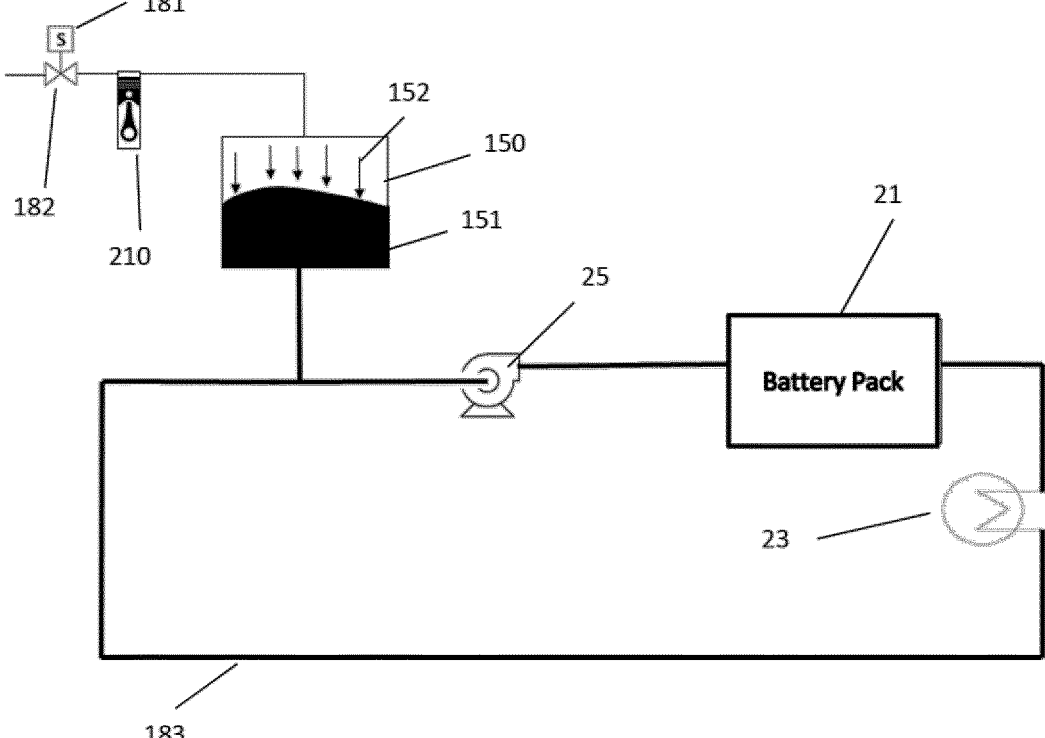
FIG. 27 is a schematic diagram of an alternative thermal management system suitable for use with embodiments of the invention.

FIG. 27 shows an alternative embodiment of the thermal management system 18. As shown in FIG. 27 the thermal management system 18 comprises a two-way control valve 182 positioned upstream from the reservoir 150. A pump 210 is positioned between the reservoir 150 and the two-way control valve 182. The pump 210 is configured to pressurise the reservoir 150 by pumping air from the atmosphere into the reservoir 150 when the two-way control valve 182 is in an open position. The two-way control valve 182 may be closed when the desired pressure within the reservoir 150 is achieved. This ensures that the pressure within the reservoir 150 is maintained.

The reservoir 150 illustrated in FIG. 27 is in constant fluid communication with the coolant loop 183 such that the pressure in the coolant loop 183 may be maintained by the pressure of the air 152 within the reservoir 150. The pressure within the reservoir 150 may be monitored and when the pressure within the reservoir drops below a target operating value the valve 182 and pump 210 may be actuated to pressurise the reservoir 150 and thus coolant loop 183 to the target operating pressure.

Figure 28:
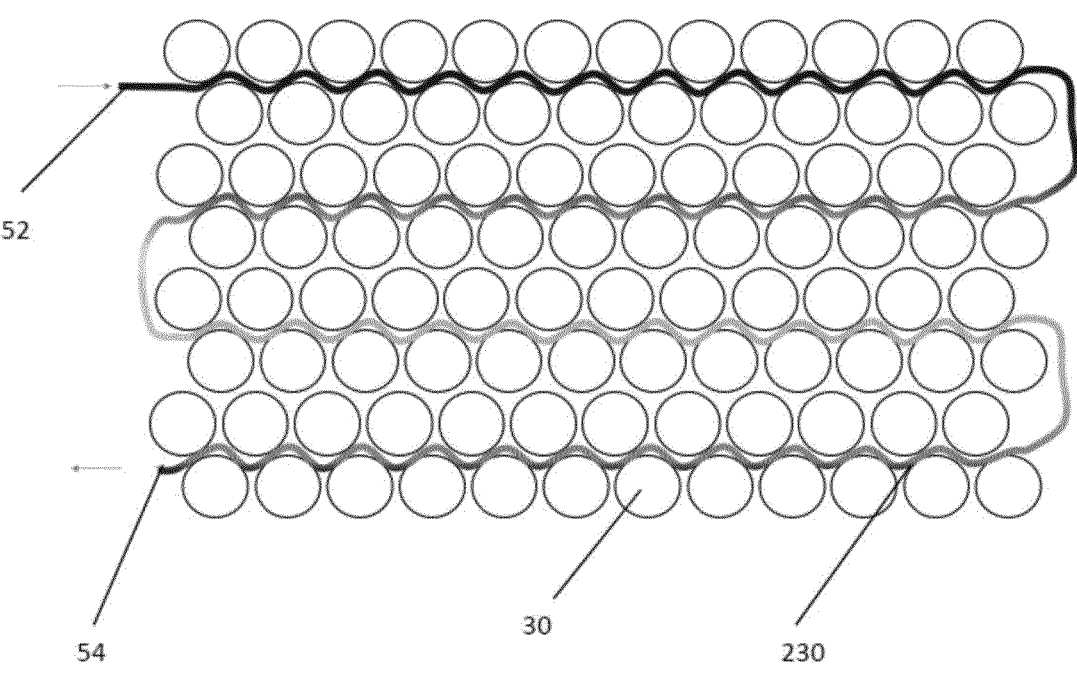
FIG. 28 is a top plan view of an array of cells and a serpentine duct with duct wall thickness varying along the length of the duct.
Figure 29:
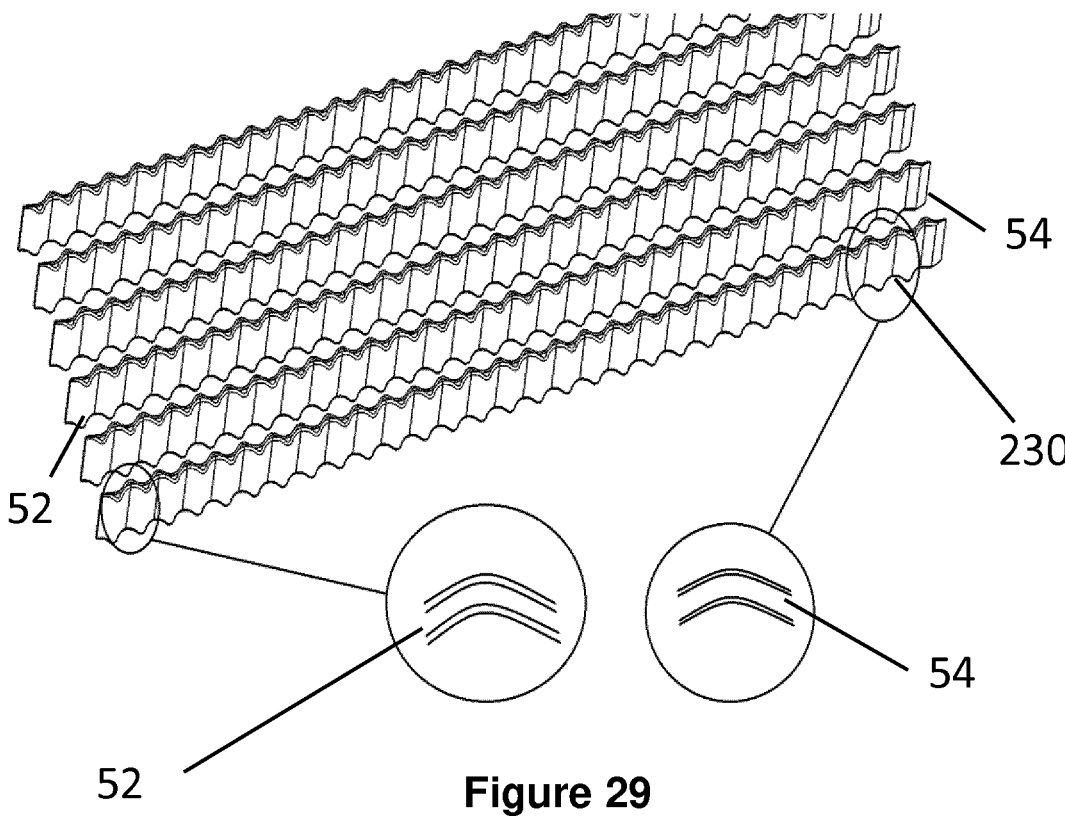
FIG. 29 shows a perspective view of a plurality of straight ducts with duct wall thickness varying along the length of the ducts.

Referring to the drawings and initially to FIGS. 28 to 29, there is shown a duct 230 capable of engaging at least part of a surface area of a heat source 30, the duct 230 extending along and engageable with at least part of the surface area of the heat source 30 along all or part of the length of the heat source 30 from a first engagement position after inlet 52 to at least one final engagement position after outlet 54 between the duct 230 and heat source 30. A heat transfer fluid flows along an internal conduit of the duct 230 such that heat can be transferred between the duct 230 and the heat source 30 via the heat transfer fluid about the engageable surface areas of the duct 230 and the heat source 30. The duct 230 is adapted to allow variable thermal transfer via the heat transfer fluid between the engageable surface areas of the duct 230 and the heat source 30.

The duct 230 is adapted to allow variable thermal transfer via the heat transfer fluid between the engageable surface areas of the duct 230 and the heat source 30 along the length of the duct 230.

Advantageously, the duct 230 being adapted to allow variable thermal transfer via the heat transfer fluid between the engageable surface areas of the duct 230 and the heat source along the length of the duct 230 compensates for the variation in temperature of the heat transfer fluid as a result of ongoing thermal transfer as the heat transfer fluid flows along the length of the duct 230. This ensures uniform thermal transfer between the heat source 30 and the duct 230 via the heat transfer fluid along the length of the duct 230 as other parameters such as fluid temperature vary. The heat source 30 comprises a battery pack 21 comprising a plurality of cells 30. The duct 230 is a flexible duct although in some embodiments, the duct 230 is a rigid duct. In these rigid embodiments, the duct 230 is a metal or metal alloy duct.

The duct 230 is positioned proximally to the surface of the heat source 30 such that heat can be exchanged between the duct 230 and the heat source 30. The duct 230 is positioned proximally to the surface of the cells 30 such that heat can be exchanged between the duct 230 and the cells 30.

Figure 30:
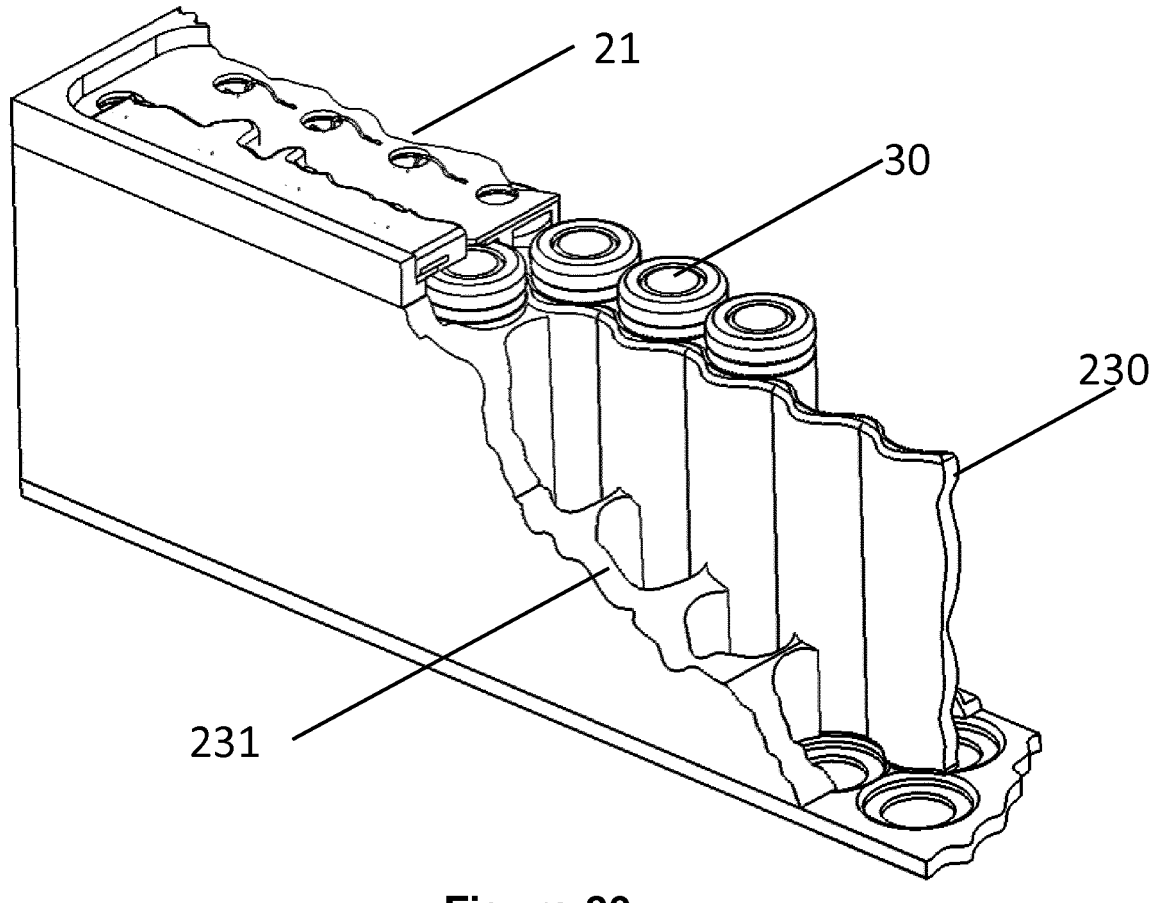
FIG. 30 is a cutaway perspective view of a part of a battery pack showing the potting material.

In one embodiment, where the duct 230 is a flexible duct 50/230, a potting material 231 see FIG. 30 is provided adapted to act as a support for at least a part of the duct 50/230. Advantageously the flexible duct 50/230 can closely conform to the surface shape of the heat source/cells 30 within the pack 21 while being reinforced by the potting material 231 which acts to prevent the flexible duct 50/230 from over inflation and/or bursting.

The duct 230 is configured to carry the heat transfer fluid from an inlet 52 to an outlet 54 to transfer thermal energy between the heat source/cells 30 and the duct 230 at their engageable contact surfaces via the heat transfer fluid and wherein the thermal resistance of the duct 230 at the inlet 52 is higher than the thermal resistance of the duct at the outlet 54. This is advantageous as varying the thermal resistance of the duct 230 along the length of the duct 230 promotes a uniform temperature distribution across the heat source/battery pack 21. In particular, having a higher thermal resistance at the inlet to the duct 230 prevents over cooling or heating of heat source/cells 30 located proximal to the inlet 52 where the temperature differential between the heat transfer fluid and the heat source/cells 30 is at its greatest. The thermal resistance of the duct 230 is varied linearly or non-linearly along the length of the duct 230 such that the thermal resistance of the duct 230 decreases as the temperature differential between the heat transfer fluid and the heat source/cells 30 also decreases, thereby promoting uniform power dissipation along the length of the duct 230.

In one embodiment the wall thickness of the duct 230 may be thicker at the inlet 52 compared to the outlet 54 as illustrated in FIG. 29 where a vertical section through the duct 230 at the outlet and the inlet is shown illustrating the variation in duct wall thickness. This is advantageous as increasing the wall thickness also increases the thermal resistance of the duct 230. As such increasing the wall thickness of the duct 230 at the inlet also increases the thermal resistance of the duct 230.

In an embodiment the wall thickness of the duct may vary linearly along the longitudinal length of the duct 230. In another embodiment the wall thickness of the duct 230 may vary non-linearly along the longitudinal length of the duct 230. Varying the wall thickness of the duct 230 along the longitudinal length of the duct 230 has the effect of varying the thermal resistance of the duct 230 along its longitudinal length.

In an embodiment the wall thickness may be varied such that a substantially constant power dissipation is achieved along the longitudinal length of the duct 230. This is advantageous as it promotes an even temperature distribution throughout the array of cells 30. This may be achieved by increasing the thermal resistance along the length of the duct 230.

Figure 31:
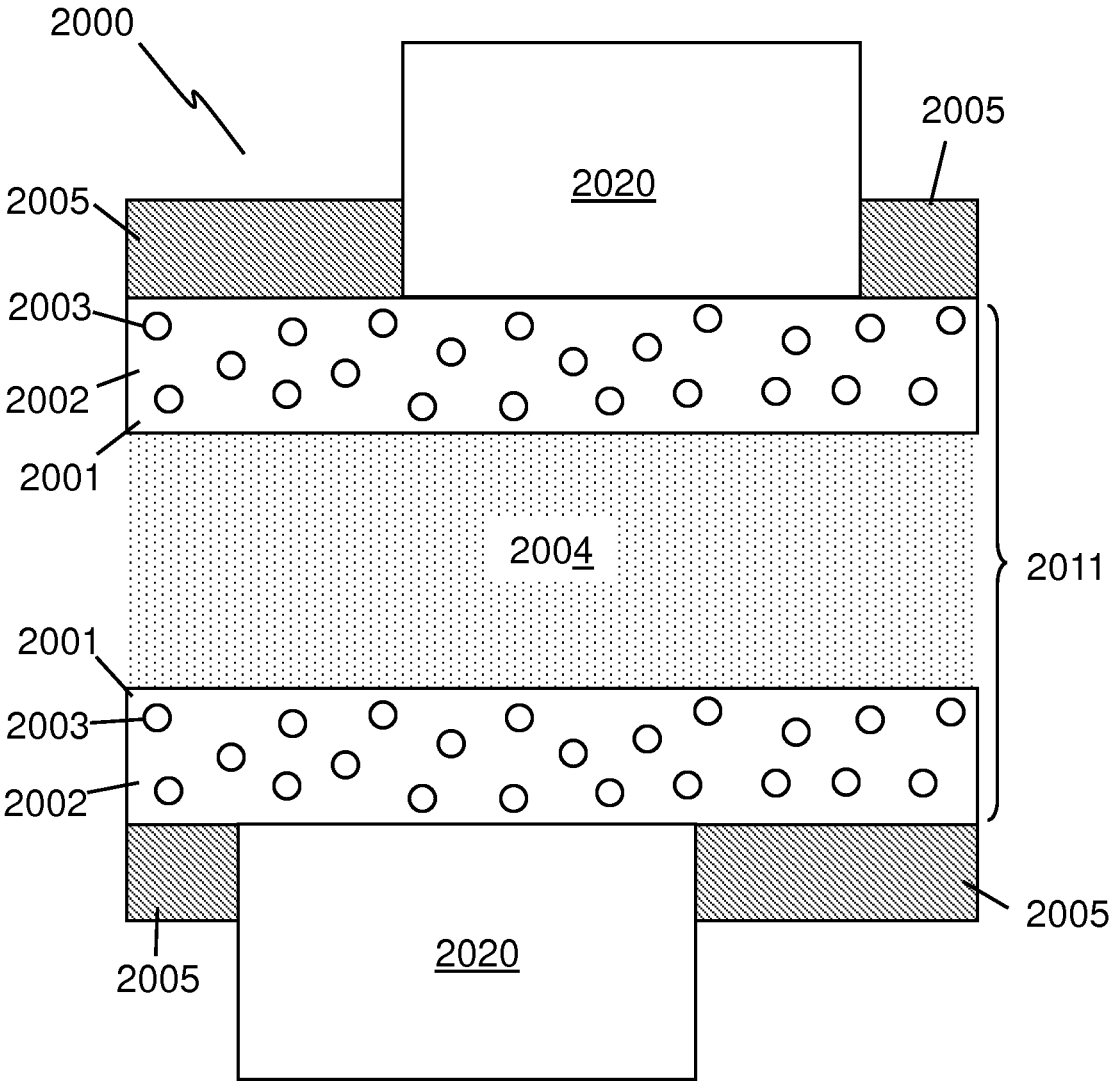
FIG. 31 is a cross sectional schematic view of a duct wherein the duct material comprises a matrix and a filler.

In FIG. 31 there is shown a schematic cross section of a battery pack indicated generally by the numeral 2000. The battery pack 2000 includes a duct 2011 used to thermally manage cells 2020. The duct 2011 comprises flexible duct material 2001 comprising a matrix 2002 and a filler 2003. The flexible duct carries a fluid 2004 such as air, water or a water-glycol mixture. Heat is transferred between cells 2020 and the coolant 204 via the duct material 2001.

The matrix 2002 is a flexible plastic or polymer material, in this case LDPE, LLDPE, HDPE polyester, silicone or rubber. The matrix 2002 is electrically insulating. The matrix 2002 has a thermal conductivity less than 15 $Wm^{-1}K^{-1}$, ideally less than 10 $Wm^{-1}K^{-1}$, 5 $Wm^{-1}K^{-1}$ and/or 1 $Wm^{-1}K^{-1}$.

The filler 2003 comprises particles of a filler material and these are dispersed throughout the matrix 2002. In preferred embodiments the filler 2003 comprises NANOCYL® NC7000 series thin multiwall carbon nanotubes however any suitable filler material may be used such as a carbon-based filler material such as carbon, carbon black, graphite, graphite platelets graphene, multi-walled carbon nanotubes or single-wall carbon nanotubes or a ceramic filler material such as aluminium oxide, silicon carbide, boron nitride, silicon nitrate, alumina, aluminium nitride or zinc oxide. The particles of filler material may be elongate and tubular having a diameter of 1-10 nm and a length of 0.5-5 nm. Alternatively the particles of filler may be substantially spherical with an average diameter of between 1 nm and 10 μm.

The thermal conductivity of the filler 2003 is greater than the thermal conductivity of the matrix 2002. Ideally the The filler 2003 has a thermal conductivity greater than 10 $Wm^{-1}K^{-1}$ and/or greater than 100 $Wm^{-1}K^{-1}$. The duct material 2001 comprises less than 25% by volume of filler 2003, ideally 5-18% by volume of filler or 15% by volume of filler 2003. Incorporating a limited amount of filler 2003 into the matrix provides an increased thermal conductivity while maintaining a low electrical conductivity and favourable mechanical properties (i.e. suitable flexibility for an inflatable duct).

In this example, the duct material 2001 has a thermal conductivity greater than 0.33 $Wm^{-1}K^{-1}$ at room temperature, ideally greater than 1 $Wm^{-1}K^{-1}$ and/or 10 $Wm^{-1}K^{-1}$. This means that the heat transfer through the duct material 2011 is better than a conventional polymer duct. The duct material 2001 itself is electrically insulating, since the electrical conductivity of the duct material 2001 is dominated by the electrical properties of the non-conductive matrix 2002. The electrically insulating nature of the duct material/matrix significantly reduces the risk of short circuits when compared with a metallic duct.

The duct 2011 is at least partially surrounded by a potting material 2005 which acts to reinforce the duct 2011 at places where it does not contact the wall of a cell 2020. Incorporation of filler 2003 within matrix 2002 can alter the mechanical properties of the duct 2001, particularly for high concentrations of filler 2003. Where this leads to any reduction in mechanical strength the reinforcing material 5 can be used counteract such effects. This embodiment can be used as an alternative or in combination with the variable wall thickness embodiment.

Figure 32:
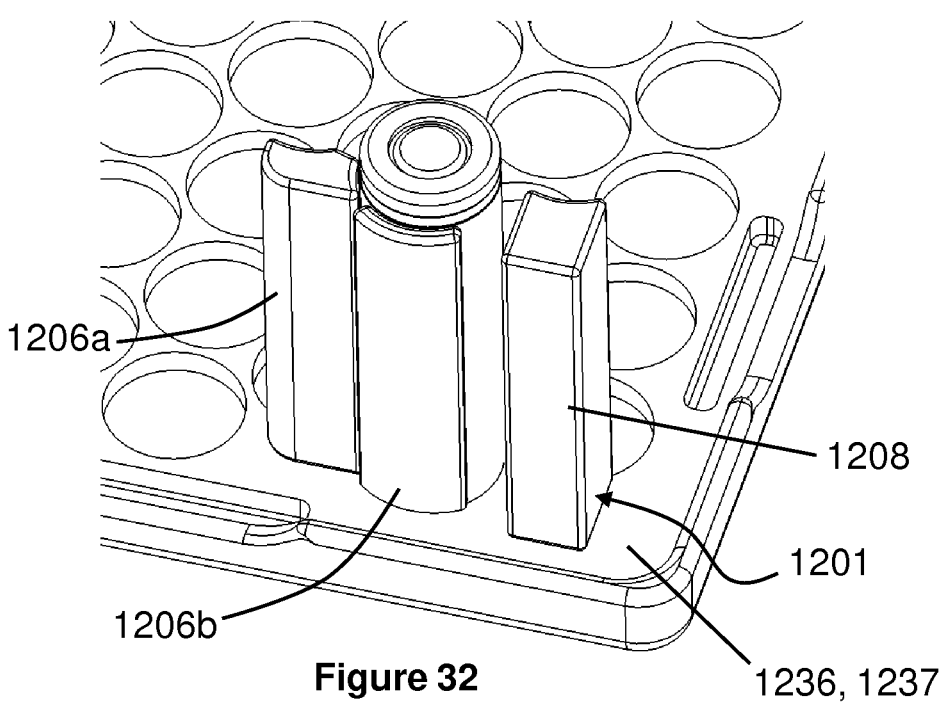
FIG. 32 is a perspective view of a further support structure.
Figure 33:
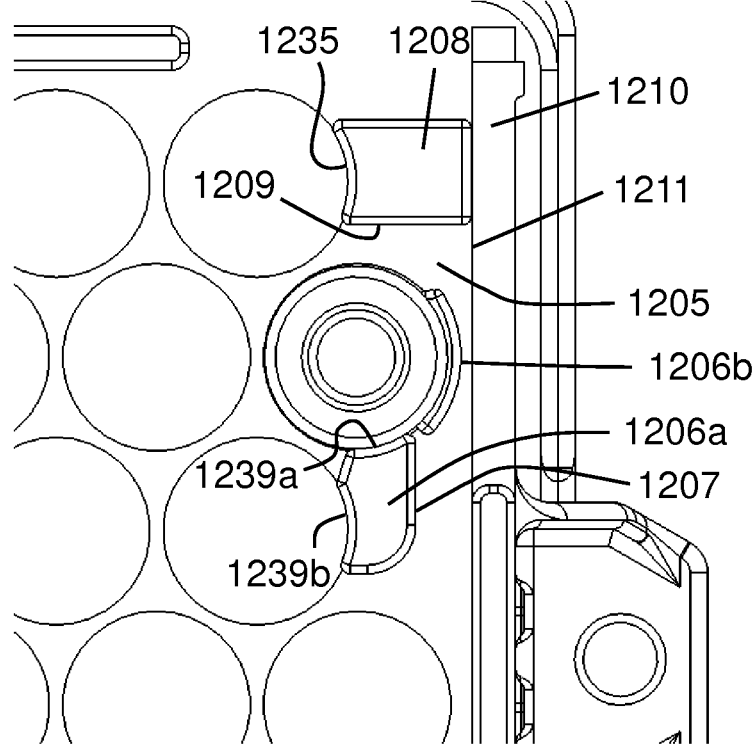
FIG. 33 is a plan view of the support structure of FIG. 32.

Referring now to FIGS. 32 and 33 there is shown a further support structure 1201 having an outer guide formation, an inner guide formation and a guide channel 1205 therebetween. The support structure 1201 is used to prevent a flexible duct from kinking, bulging and/or bursting when the duct changes direction. The support structure 1201 is dimensioned such that the cells positioned on the end of each row of the array have substantially the same thermal contact area with the duct as cells located in the centre of the array. The support structure 1201 achieves this by shielding or thermally insulating a portion of the end cells from thermal contact with the duct.

The outer guide formation of support structure 1201 is formed by the combination of an outer upstand 1208 and the inner surface 1211 of a wall 1210 of the outer pack casing (see FIG. 33). The outer upstand 1208 is located adjacent to at least one cell at the edge of the array of cells. The outer upstand 1208 is a block that has a cell-abutting face 1235 which is curved to match the shape of a cell sidewall, and an outer supporting face 1209 which extends from the cell-abutting face 1235. The outer upstand 1208 is integrally formed with the lower clamshell 1237 of the battery pack housing 1236.

The inflatable duct is supported by both the outer supporting face 1209 of the upstand 1208 and the inner surface 1211 of the battery pack wall 1210. Using the battery pack wall 1210 as part of the outer guide formation removes the need for a larger support structure and therefore reduces the width of, and eliminates dead-space within, the battery pack.

The inner guide formation of support structure 1201 is formed by a combination of an inner upstand 1206a and an interface portion 1206b. The inner upstand 1206a is similar in construction to the outer upstand 1208. The inner upstand 1206a is a block that is integrally formed with the lower clamshell 1237 of battery pack housing 1238. The inner upstand 1206a is located on the opposing side of the guide channel 1205 to the outer guide formation. The inner upstand 1206a has two curved cell-abutting faces 1239a, 1239b for abutting two adjacent, spaced apart cells.

The inner upstand 1206a further has an inner supporting face 1207 that extends between the cell-abutting faces 1239a, 1239b. The inner supporting face 1207 of the inner upstand 1206a has a substantially planar portion and a substantially curved portion that extends from the substantially planar portion towards the sidewall of a cell. The inner supporting face 1207 provides support to the duct thereby preventing the duct bulging and wrapping around an end cell.

The interface portion 1206b is provided by a compressible pad adhered to the surface of a cell. Specifically, the pad is open-cell polyvinyl chloride (PVC) tape. Alternatively, closed-cell PVC or polyurethane foam could be used, or other suitable compressible material. In use, the interface portion 1206b of the inner guide formation extends from a cell-abutting face 1239a of the first part 1206a and around a portion of the cell to which it is adhered. When the flexible duct (not shown) is inflated it presses against the inner upstand 1206a and an interface portion 1206b of the inner guide formation.

The interface portion 1206b is used to limit the thermal contact between the duct and the peripheral cell to which it is attached. The interface portion 1206b wraps around the exterior surface of an end cell such that when the duct is located within the guide path 1205 the duct does not contact the end cell in the region of the interface portion 1206b. The skilled reader will understand that the extent to which the interface portion 1206b extends around the end cell is dependent upon the required thermal contact between the duct and the cells. The interface portion 1206b should extend around the end cell sufficiently to ensure that the duct does not contact the end cell more than any other cell within the array.

The skilled person will appreciate that both of the inner upstand 1206a and an interface portion 1206b may be compressible and/or may be integrally connected to one another. Interface portion 1206b may be integrally formed with the lower clamshell 1237.

Figure 34:
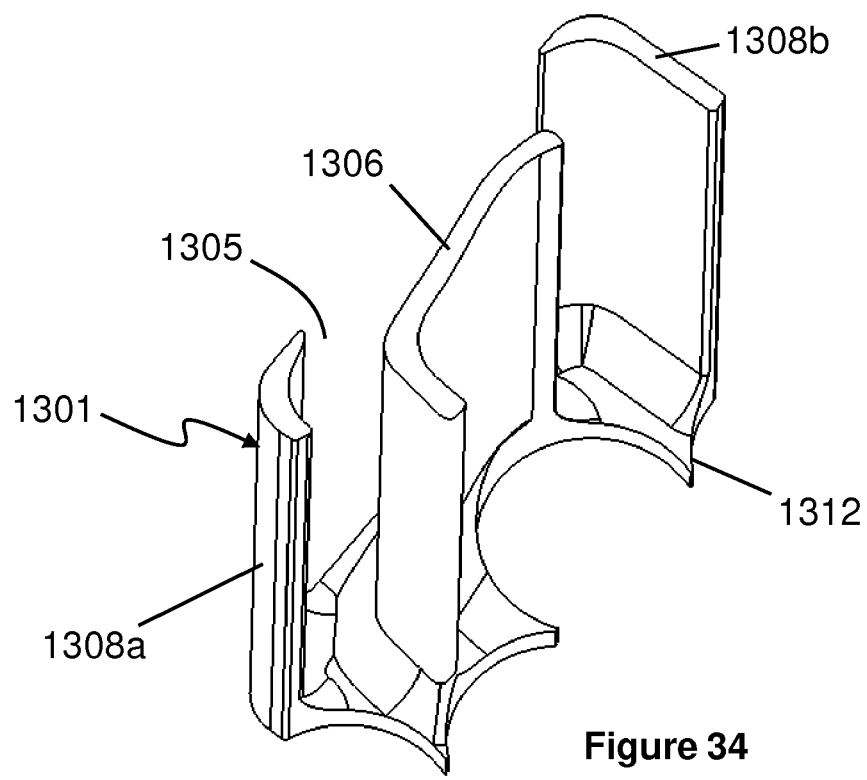
FIG. 34 is a perspective view of a further support structure.
Figure 35:
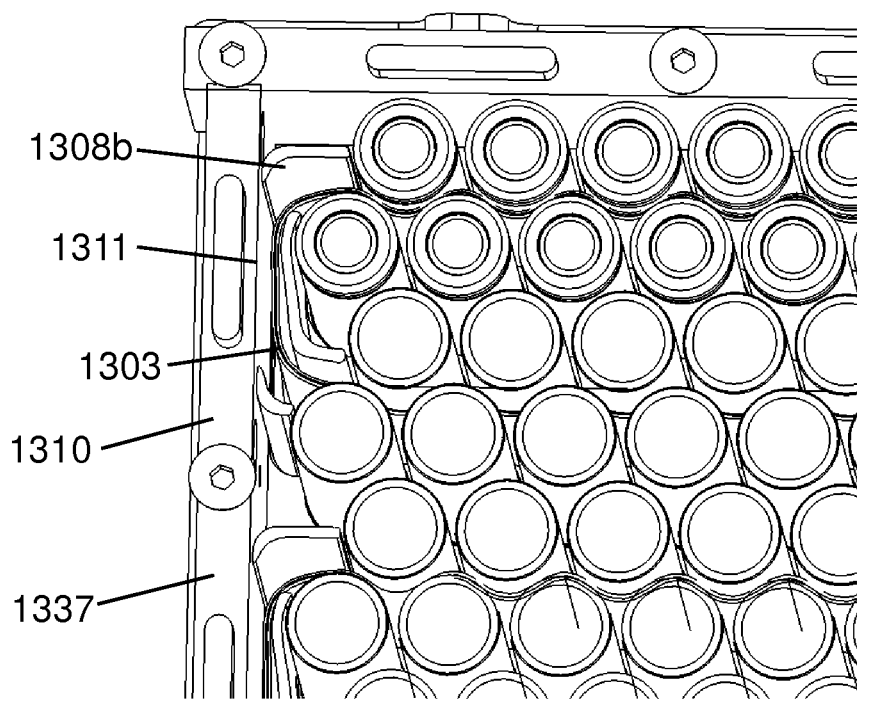
FIG. 35 is a perspective view of the support structure of FIG. 34 installed within a battery pack.
Figure 36:
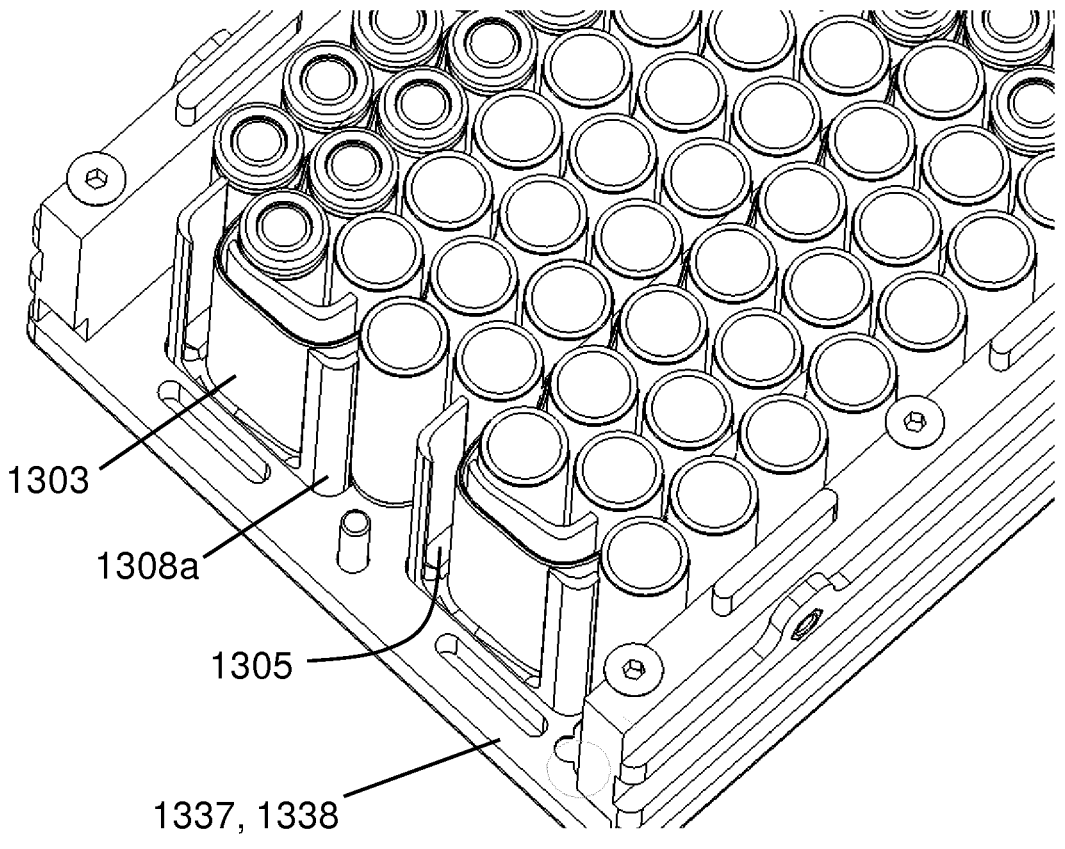
FIG. 36 is an additional perspective view of the support structure of FIG. 35 installed within a battery pack.

Referring now to FIGS. 34 to 36 there is shown a yet further embodiment of a support structure, indicated generally by reference numeral 1301. The support structure 1301 of this embodiment has an outer guide formation 1308, an inner guide formation 1306 and a guide channel 1305 therebetween. The support structure 1301 is used to prevent a flexible duct from kinking, bulging and/or bursting when the duct changes direction. The support structure 1301 is dimensioned such that the cells positioned on the end of each row of the array have substantially the same thermal contact area with the duct as cells located in the centre of the array. The support structure 1301 achieves this by shielding or thermally insulating a portion of the end cells from thermal contact with the duct.

The outer guide formation of support structure 1301 is formed by the combination of a first outer upstand 1308a, a second outer upstand 1308b and the inner surface 1311 of a wall 1310 of the outer pack casing (see FIG. 36). The first and second upstanding structures 1308a, 1308b are spaced apart and both are connected to a support structure base 1312. The lower clamshell 1337 of the battery pack housing 1338 may include appropriate recesses to accommodate the support structure base 1312 at the edge of the array of cells although in optional embodiments the support structure 1301 may be integrally formed with the lower clamshell 1337.

The inflatable duct is supported by the first outer upstand 1308a, the second outer upstand 1308b and the inner surface 1311 of the battery pack wall 1310. Using the battery pack wall 1310 as part of the outer guide formation removes the need for a larger support structure and therefore reduces the width of, and eliminates dead-space within, the battery pack.

The upstanding structures 1308a, 1308b are curved and define corners of the guide formation 1305. The gap between the upstanding structures 1308a, 1308b can be used to pull excess amounts of the duct through the support structure 1301 when arranging the duct in the battery pack. The first outer upstand 1308a the second outer upstand 1308b prevent the duct expanding such that it would wrap around the exterior of an end cell causing the end cell to have an increased thermal contact with the duct.

The support structures can be made from any suitable rigid, semi-rigid or compressible material which has sufficient rigidity to support a flexible duct, for example metal, plastic or rubber. In an important example, the support structures are made from the potting material used within the battery pack or possess similar thermal propagation prevention properties as the bulk potting compound. For example, the support structures can be manufactured by pouring a potting material into a suitable mold, or by cutting out a support structure from e.g. a block of pre-cured thermally insulating foam. In alternatives, the support structure(s) can be integrally formed with the walls of the battery pack, for example with either of the upper or lower clamshell. In such examples the support structures are extrusions from the plastic shells as opposed to an insert within the battery pack.

The skilled reader will appreciate that various changes and modifications can be made to the present invention without departing from the scope of the present application. The thermal management system described herein may be used with any kind of battery pack having one or more individual cells. For example, the present invention may be employed in a battery pack within an auxiliary power unit (APU) for a long-distance haulage truck, a traction battery of a battery electric or hybrid vehicle, an energy storage system or any other battery pack in the marine, aerospace, automotive, industrial and energy storage sectors requiring thermal management.

The flexible duct 50 may be in indirect contact with side surface(s) or any other surface(s) of the one or more cells 30 via an interface region or interface material such as a casing sheath surrounding the cell(s) 30 or a thermally conductive filler, paste or adhesive. In optional embodiments, the flexible duct may be at least partially in contact with end surface(s) of the cell(s).

In the preceding discussion of the invention, unless stated to the contrary, the disclosure of alternative values for the upper or lower limit of the permitted range of a parameter, coupled with an indication that one of the values is more highly preferred than the other, is to be construed as an implied statement that each intermediate value of the parameter, lying between the more preferred and the less preferred of the alternatives, is itself preferred to the less preferred value and also to each value lying between the less preferred value and the intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof.

What is claimed is:

1. A battery pack comprising: one or more cells; a flexible and inflatable duct positioned proximally to a surface of at least one of the one or more cells such that heat can be exchanged between the duct and at least one of the one or more cells; and a potting material adapted to act as a support for at least a part of the duct wherein, in use, the duct partially conforms to the surface of the one or more cells by a heat transfer fluid flowing through the duct to pressurize the duct into an expanded state where no pre-formed radiused depressions are formed into the duct for conforming the duct in the expanded state to the one or more cells and wherein no portion of the duct comes into contact with another portion of the same duct further along a length of the duct or with a different duct, wherein the duct is free from internal obstructions such that in use a flow of the heat transfer fluid is not divided into separate paths in a same direction.

2. A battery pack as claimed in claim 1 wherein the battery pack comprises a plurality of ducts.

3. A battery pack as claimed in claim 1 wherein a coolant material is able to flow through the duct to pressurize the duct into the expanded state.

4. A battery pack as claimed in claim 1 wherein the duct comprises one or more straight sections.

5. A battery pack as claimed in claim 1 wherein the duct is a serpentine duct.

6. A battery pack as claimed in claim 1 wherein the battery pack comprises an array of cylindrical cells.

7. A battery pack as claimed in claim 1 wherein the duct is positioned between and/or adjacent to one or more cells in direct thermal contact with side surface(s) of the one or more cells.

8. A battery pack as claimed in claim 1 wherein the duct is in indirect thermal contact with side surface(s) of the one or more cells via an interface region or an interface material.

9. A battery pack as claimed in claim 1 wherein the duct has an open configuration such that a coolant material is able to flow through the duct and wherein the or each duct is maintained in the open configuration by pressurised coolant fluid within the or each duct and/or via adhesion to the potting material.

10. A battery pack as claimed in claim 1 wherein the potting material comprises foam.

11. A battery pack as claimed in claim 10 wherein the potting material comprises a thermally insulating foam.

12. A battery pack as claimed in claim 1 wherein the potting material acts as a rigid support for at least apart of at least one duct.

13. A battery pack as claimed in claim 1 wherein the potting material secures the one or more cells and the duct in position within the battery pack.

14. A battery pack as claimed in claim 1 wherein the duct is formed from an inflatable plastics material, and the inflatable plastics material is polyester, low-density polyethylene (LDPE), linear low-density polyethylene (LLDPE) or high-density polyethylene (HDPE).

15. A battery pack as claimed in claim 1 wherein the duct is a single-lumen duct or a multi-lumen duct.

16. A battery pack as claimed in claim 1 comprising at least one support configured to provide support to at least one duct and wherein the or each support is configured to provide support to a duct at a point where the duct changes and/or reverses direction and wherein the or each support comprises a guide channel.

17. A battery pack as claimed in claim 1 operably connected to a thermal management system.

18. A method of manufacturing a battery pack, the method comprising: providing one or more cells; positioning a flexible and inflatable duct proximally to a surface of at least one of the one or more cells such that heat can be exchanged between the duct and the at least one of the one or more cells; inserting fluid into the duct to pressurize the duct into an expanded state such that the duct partially conforms to the surface of the one or more cells where no pre-formed radiused depressions are formed into the duct and wherein no portion of the duct comes into contact with another portion of the same duct further along a length of the duct or with a different duct; and providing a potting material adapted to act as a support for at least a part of the duct, wherein the duct is free from internal obstructions such that in use a flow of the fluid is not divided into separate paths in a same direction.

19. A method as claimed in claim 18 wherein the method comprises inserting the potting material into the battery pack.

20. A method as claimed in claim 18 wherein the method comprises inserting the potting material into the battery pack while the potting material is in a viscous or liquid state.

21. A method as claimed in claim 18 wherein the method comprises curing or hardening the potting material within the battery pack.

22. A method as claimed in claim 18 wherein the method comprises curing or hardening the potting material within the battery pack while the duct is in a inflated state and/or an open configuration.

23. A method as claimed in claim 18 wherein the method comprises maintaining pressure within the duct until the potting material is set or hardened.

24. A method as claimed in claim 18 wherein the method comprises maintaining, via adhesion to the potting material, the duct in an open configuration within the battery pack.

25. A battery pack comprising: one or more cells; a flexible and inflatable duct positioned proximally to a surface of at least one of the one or more cells such that heat can be exchanged between the duct and at least one of the one or more cells; and a potting material adapted to act as a support for at least a part of the duct wherein, in use, the duct partially conforms to the surface of the one or more cells by a heat transfer fluid flowing through the duct to pressurize the duct into an expanded state where no pre-formed radiused depressions are formed into the duct for conforming the duct in the expanded state to the one or more cells and wherein no portion of the duct comes into contact with another portion of the same duct further along a length of the duct or with a different duct, wherein the duct comprises no partitions to divide a flow of the heat transfer fluid.

\* \* \* \* \*